United States Patent
Bickham et al.

(10) Patent No.: US 6,943,935 B2
(45) Date of Patent: Sep. 13, 2005

(54) DISPERSION-MANAGED CABLE FOR RAMAN-ASSISTED TRANSMISSION

(75) Inventors: Scott R. Bickham, Corning, NY (US);
David G. Dalgoutte, Ormskirk (GB);
James M. Grochocinski, Chester (GB);
Michael Vasilyev, Belle Mead, NJ (US)

(73) Assignee: Corning Incorporated, Corning, NY (US)

( * ) Notice: Subject to any disclaimer, the term of this patent is extended or adjusted under 35 U.S.C. 154(b) by 552 days.

(21) Appl. No.: 10/094,530

(22) Filed: Mar. 8, 2002

(65) Prior Publication Data

US 2002/0181076 A1 Dec. 5, 2002

Related U.S. Application Data

(60) Provisional application No. 60/276,108, filed on Mar. 16, 2001, provisional application No. 60/298,257, filed on Jun. 14, 2001, provisional application No. 60/328,279, filed on Oct. 9, 2001, provisional application No. 60/328,550, filed on Oct. 11, 2001, and provisional application No. 60/339,864, filed on Oct. 30, 2001, now abandoned.

(51) Int. Cl.⁷ .............................. H01S 3/00; H04J 14/02
(52) U.S. Cl. ....................... 359/334; 359/337.5; 398/81
(58) Field of Search .............................. 359/334, 337.5; 398/81

(56) References Cited

U.S. PATENT DOCUMENTS

| | | | |
|---|---|---|---|
| 5,956,440 A | 9/1999 | Mikami et al. ............... 385/24 |
| 6,021,245 A | 2/2000 | Berger et al. ............... 382/123 |
| 6,084,993 A | 7/2000 | Mukasa ....................... 385/24 |
| 6,141,090 A | 10/2000 | Mamyshev et al. ........ 356/73.1 |
| 6,229,935 B1 | 5/2001 | Jones et al. ................... 385/24 |
| 6,330,381 B1 | 12/2001 | Lu et al. ....................... 385/24 |
| 6,366,728 B1 | 4/2002 | Way et al. ................... 385/123 |
| 6,366,729 B1 * | 4/2002 | Brandon et al. ............. 385/123 |
| 6,404,964 B1 * | 6/2002 | Bhagavatula et al. ....... 385/123 |
| 6,580,861 B2 | 6/2003 | Bickham et al. ............ 385/123 |
| 6,693,740 B2 * | 2/2004 | Gray et al. ............... 359/337.4 |
| 6,721,481 B2 * | 4/2004 | Terahara et al. ............ 385/122 |
| 2001/0021298 A1 | 9/2001 | Mukasa ....................... 385/124 |
| 2001/0024307 A1 | 9/2001 | Franco et al. ............... 359/161 |
| 2001/0028491 A1 | 10/2001 | Mukasa ....................... 359/161 |
| 2001/0055436 A1 | 12/2001 | Sugizaki et al. ............. 385/10 |
| 2002/0012509 A1 | 1/2002 | Mukasa ....................... 385/123 |
| 2002/0028051 A1 | 3/2002 | Bickham et al. ............ 385/123 |

FOREIGN PATENT DOCUMENTS

| | | | | |
|---|---|---|---|---|
| EP | 0 936 750 | 8/1999 | ............ H04B/3/00 |
| EP | 0 730 354 | 8/2001 | ........... H04B/10/18 |
| EP | 1 130 824 | 9/2001 | ........... H04B/10/17 |
| EP | 1 186 919 | 3/2002 | ............ G02B/6/16 |
| EP | 1 202 477 | 5/2002 | ........... H04B/10/17 |
| EP | 1 054 521 | 6/2002 | ........... H04B/10/18 |
| GB | 2 268 018 | 12/1993 | ........... H04B/10/18 |
| GB | 2 299 473 | 10/1996 | ........... H04B/10/18 |
| GB | 2 330 026 | 4/1999 | ........... H04B/10/18 |
| WO | WO 99/49340 | 9/1999 | ............ G02B/6/00 |
| WO | WO 99/57822 | 11/1999 | ........... H04B/10/18 |
| WO | WO 02/19576 | 3/2002 | ........... H04B/10/18 |
| WO | WO 02/42815 | 5/2002 | ............ G02B/6/16 |

OTHER PUBLICATIONS

Pilipetskii et al, "The Effect of Dispersion Compensation on System Performance when Nonlinearities are Important", *IEEE Photonics Technology Letters*, vol. 11, No. 2, Feb. 1999, pp. 284–286.

(Continued)

*Primary Examiner*—Mark Hellner
(74) *Attorney, Agent, or Firm*—Joseph M. Homa

(57) ABSTRACT

An apparatus for transporting an optical signal is provided. The apparatus includes sections of optical fiber span with at least one section negative dispersion, negative slope fiber positioned at a distance from the output. A pump light emitting device optically coupled to the optical fiber span near the output is provided for generating an amplification signal.

41 Claims, 13 Drawing Sheets-

OTHER PUBLICATIONS

Tsuritani et al, "Performance comparison between SCDCF-based system and RDF–based system in slope–compensating transoceanic WDM transmission", *Electronic Letters*, Mar. 2, 2000, vol. 36, No. 5, pp. 447–448.

Zhu et al, "Experimental Investigation of Dispersion Maps for 40×10 Gb/s Transmission over 1600 km of Fiber with 100–km Spans Employing Distributed Raman Amplification", Optical Fiber Communication Conference and Exhibit, 2001, OFC Mar. 17–22, 2001, pp. TuN3–T1–3, vol. 2.

Zhu et al, "800 Gbits/s (80×10.664 Gbit/s) WDM transmission over 5200 km of fibre employing 100 km dispersion-managed spans", *Electronics Letters*, Nov. 22, 2001, vol. 37, No. 24, pp. 1467–1469.

Nakamoto, et al., *"1.05 Tbit/s WDM Transmission over 8,186km Using Distributed Raman Amplifier Repeaters"*, Optical Fiber Communication Communication Conference and Exhibit, 2001, vol. 2, pps. TuF6–1–TuF6–3.

Ito, et al., *"3.2 Tb/s–1500 km WDM transmission experiment using 64 nm hybrid repeater amplifiers"*, Optical Fiber Communication Conference, 2000, pps. 239–241.

Zhu, et al., *"Experimental comparison of dispersion-managed fiber types in a 16–channel 40 Gb/s 500 km (6 /spl times/84.5 km) Raman–assisted transmission link"*, Optical Fiber Communication Conference and Exhibit, 2002, Mar. 17–22, 2002, pps. 557–558.

Knudsen, et al., *"New Dispersion–Slope Managed Fiber Pairs for Ultra Long Haul Transmission Systems"*, National Fiber Optic Engineers Conference, 2001 Technical Proceedings, pps. 1599–1607.

Bromage et al, "S–band all–Raman amplifiers for 40×10 Gb/s transmission over 6×100 km of non–zero dispersion fiber", Optical Fiber Communication Conference and Exhibit, 2001; OFC Mar. 17–22, 2001, pp. PD4 103, vol. 4.

Chbat et al, "Increasing the capacity in real WDM network requirements: dispersion management and wide–band flat-grain optical amplifiers in Nx10 Gb/s transmission systems", IEEE/LEOS 1996 Summer Topical Meetings, pp. 67–68.

Fürst et al, "Influence of the dispersion map on limitations due to cross–phase modulation in WDM Multispan transmission systems", Optical Fiber Communication Conference and Exhibit, 2001, OFC Mar. 17–22, 2001, pp. MF4/1–MF4/3, vol. 1.

U.S. Appl. No. 60/272,015, Berkey et al., filed Feb. 28, 2001.

U.S. Appl. No. 60/309,160, Berkey et al., filed Jul. 31, 2002.

U.S. Appl. No. 09/547,598, filed Apr. 11, 2000, Berkey et al.

U.S. Appl. No. 09/558,770, filed Apr. 26, 2000, Allen et al.

U.S. Appl. No. 09/722,804, filed Nov. 27, 2000, Bookbinder et al.

U.S. Appl. No. 09/822,168, filed Mar. 31, 2001, Berkey et al.

U.S. Appl. No. 09/996,632, filed Nov. 28, 2001, Berkey et al.

U.S. Appl. No. 10/023,291, filed Dec. 14, 2001, Berkey et al.

Gurib et al, "Experimental evaluation of TeraLight™ resistance to cross–nonlinear effects for channel spacings down to 50GHz", *Electronics Letters*, May 25, 2000, vol. 36, No. 11, pp. 959–961.

Hainberger et al, "Optimum span configuration of Raman-amplified dispersion–managed fibers", Optical Fiber Communication Conference and Exhibit, 2001, OFC Mar. 17–22, 2001, pp. MI5/1–MI5/4, vol. 1.

Hayee et al, "NRZ Versus RZ in 10–40–Gb/s Dispersion-Managed WDM Transmission Systems", *IEEE Photonics Technology Letters*, vol. 11, No. 8, Aug. 1999, pp. 991–993.

Murakami et al, "Long–Haul 16×10 Gb/s WDM Transmission Experiment Using Higher Order Fiber Dispersion Management Technique", *IEEE Photonics Technology Letters*, vol. 11, No. 7, Jul. 1999, pp. 898–900.

* cited by examiner

DISPERSION-MANAGED CABLE FOR RAMAN-ASSISTED TRANSMISSION

CROSS REFERENCE TO RELATED APPLICATIONS

The present application claims priority to and the benefit of U.S. Provisional Patent Application Ser. No. 60/276,108 filed Mar. 16, 2001, U.S. Provisional Patent Application Ser. No. 60/298,257 filed Jun. 14, 2001, U.S. Provisional Patent Application Ser. No. 60/328,279 filed Oct. 9, 2001, U.S. Provisional Patent Application Ser. No. 60/328,550 filed Oct. 11, 2001, and U.S. Provisional Patent Application Ser. No. 60/339,864 filed Oct. 30, 2001. The foregoing provisional applications are incorporated by reference herein in their entirety.

BACKGROUND OF THE INVENTION

1. Field of the Invention

The invention relates generally to long-haul optical fiber networks, more particularly, to long-haul spans comprising dispersion managed optical fiber with signal amplification.

2. Background of the Invention

Signal degradation encountered when transmitting optical signals over long-haul optical fiber has greatly increased the need for improved optical signal amplification devices along the transmission path. Specifically, long-haul optical signal amplification presently suffers from amplification of noise along with the optical signal, resulting in a degraded signal to noise ratio (SNR) at the receiving node.

Presently, one method of long-haul signal amplification is achieved by utilizing a Raman amplification scheme. Raman amplification utilizes a pump laser optically coupled to the receiving node. The Raman pump laser provides an amplification signal propagating along the transmission path in a direction opposite the optical signal. As the amplification signal travels along the transmission path, energy is gradually transferred from the amplification signal to longer wavelengths of the optical signal through stimulated Raman scattering.

The power of the amplification signal is greatest near the output node of the long-haul optical transmission system where the pump laser inputs to the optical cable. Optical intensity of the amplification signal can be represented by the equation: Intensity=(Laser Light Power/$A_{\it{eff}}$), where $A_{\it{eff}}$ is the effective cross sectional area of the fiber.

Negative dispersion fiber, and in particular negative dispersion negative slope (NDNS) optical fiber, or so-called slope compensating optical fiber (SCF), is used to compensate for the difference in dispersion and dispersion slope of one or more optical signals at one or more wavelengths transmitted in a positive dispersion single mode transmission fiber. NDNS optical fiber also typically has a small $A_{\it{eff}}$ when compared to other forms of optical fiber used for optical signal transmission, such as typical single mode fiber which is used as the positive dispersion transmission fiber in 1550 nm systems. The small $A_{\it{eff}}$ results in higher pump laser intensity which results in greater amplification of the transmitted optical signal.

Amplification signal power tends to degrade at an approximate rate of 0.25 dB per 1 km of NDNS optical fiber as it travels along the long-haul optical transmission system at 1550 nm. Further, the minimum absolute dispersion of a particular wavelength of all of the wavelengths is typically in the range of 0 to 300 ps/nm. NDNS optical fiber is utilized, at least partially, so that the difference between the absolute dispersion between the wavelengths is very small.

In conventional communication systems, the optical signal first enters single mode fiber and then propagates into NDNS fiber. A Raman pump laser is optically coupled to the output of the NDNS section.

In Raman amplification, not only is the desired input signal amplified, but ambient noise introduced by a variety of sources as the input signal travels along a section of optical fiber is also amplified, resulting in a degraded SNR at the receiving node. The ambient noise being amplified is at least partially generated by multi-path interference (MPI) from double-Rayleigh back-scattering (DRBS) and Rayleigh back-scattering of amplified spontaneous emission (ASE).

The above mentioned noise degradation is particularly a problem in small $A_{\it{eff}}$ fiber such as NDNS fiber, primarily because most of the Raman gain occurs in the NDNS section of the long-haul optical transmission system. The small $A_{\it{eff}}$ of NDNS fiber dramatically increases the fraction of Rayleigh back-scattering falling into its propagating mode. This leads to rapid growth of noise with increasing Raman gain. In addition, at higher Raman gain, the total amplified signal power at the fiber section output becomes comparable to that of the pump and causes depletion. This, in turn, substantially degrades the Raman noise figure (NF). The noise properties of distributed Raman amplifier are typically characterized by using a "lumped noise figure" which is defined as a noise figure of an equivalent lumped amplifier placed after the fiber span that produces the same gain and optical signal-to-noise ratio as the Raman amplifier in question. For a typical Raman amplifier with polarization-independent gain $G_R$, which is the signal power at the amplifier input divided by the signal power at the amplifier output, such a lumped noise figure, hereinafter referred to as "noise figure" or "Raman noise figure", satisfies the following equation:

$$NF=[1+P_{ASE}/(h v B_O)]/G_R,$$

where $P_{ASE}$ is the power of amplified spontaneous emission (ASE) in two polarizations, generated by Raman amplifier within optical bandwidth $B_O$ centered at signal frequency v, and $h=6.62\times10^{-34}$ Joule*second is Planck's constant.

SUMMARY OF THE INVENTION

The invention relates to improvements in the long-haul amplification of the optical signal, and improvements to increase the SNR at the receiving node.

One aspect of the present invention relates to an apparatus for transporting an optical signal at a signal wavelength comprising an optical fiber span with at least one input and one output, and a pump light emitting device optically coupled to the optical fiber span. The optical fiber span comprises at least one fiber section of small effective area ($A_{\it{eff}}$) fiber, and at least one fiber section of non-small $A_{\it{eff}}$ fiber disposed between the section of small $A_{\it{eff}}$ fiber and the output. By small, we mean less than about 40 $\mu m^2$. By non-small we mean greater than about 80 $\mu m^2$.

Another aspect of the present invention relates to a method of transporting an optical signal via an optical fiber span, and providing an amplification signal to amplify the optical signal using a pump light emitting device optically coupled to the optical fiber, wherein the optical fiber span comprises a length of small effective area ($A_{\it{eff}}$) fiber and a section of non-small $A_{\it{eff}}$ fiber disposed between the section of small $A_{\it{eff}}$ fiber and an output of the optical fiber.

Another aspect of the present invention relates to an optical transmission system including optical fiber, the optical transmission system transmitting in a predetermined wavelength range, preferably having a substantially central wavelength, the system comprising an optical fiber span, and a pump light emitting device. The optical fiber span comprises two sections of positive dispersion positive slope (PDPS) optical fiber having positive dispersion and positive dispersion slope at a signal wavelength, preferably at 1550 nm, and a section of NDNS optical fiber optically coupled between the sections of PDPS fiber and having a negative dispersion and negative dispersion slope at the signal wavelength, preferably at 1550 nm. The pump light emitting device is optically coupled to one of the sections of PDPS fiber. The system preferably includes a pump laser optically coupled to the section of optical fiber span, wherein the pump laser is preferably optically coupled to the section of PDPS fiber such that the pump laser provides an amplification signal along the optical fiber span.

Another aspect of the present invention relates to an apparatus for amplification of an optical signal during long-haul transmission comprising an optical fiber and an amplification signal generator, preferably optically coupled to one of the sections of PDPS fiber to amplify the optical signal(s).

Another aspect of the present invention relates to a long-haul optical signal amplification system with an optical fiber comprising at least one input node and one output node, a section of NDNS fiber positioned at a distance from the output node, a means for generating an amplification signal at the output node, and a means for transporting the amplification signal with reduced power loss between the output node and the section of NDNS fiber.

Another aspect of the present invention relates to an apparatus for amplification of an optical signal during long-haul transmission comprising an optical fiber span and a pump light emitting device, the optical fiber span comprising a first section of optical fiber, a second section of optical fiber optically coupled to the first section of optical fiber at a first end of the second section wherein the second section of optical fiber has an effective area less than that of the first section of optical fiber, and a third section of optical fiber optically coupled to the second section of optical fiber at a second end of the second section wherein the third section of optical fiber has an effective area less than that of the first section of optical fiber and greater than that of the second section of optical fiber. The pump light emitting device is optically coupled to the third section of optical fiber for generating an amplification signal in the optical fiber.

Thus, a long-haul optical fiber transmission system containing alternating sections of optical fiber with signal amplification has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
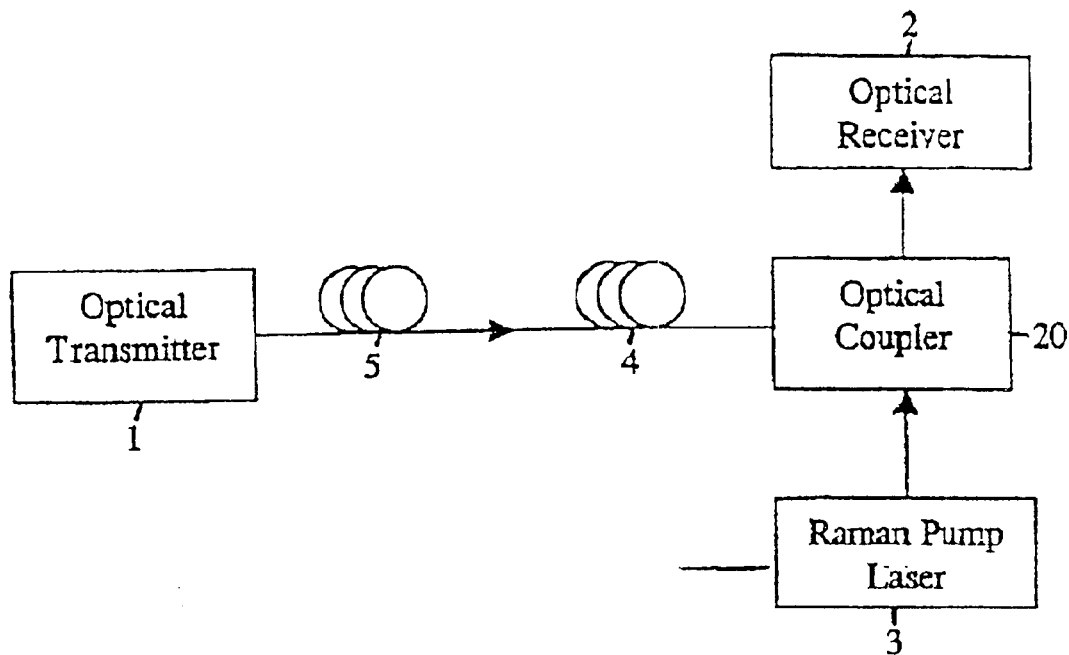
FIG. 1 is a block diagram of a first embodiment of a long-haul optical fiber system according to the present invention.

Reference will now be made in detail to presently preferred embodiments of the invention. Wherever possible, the same reference numbers will be used throughout the drawings to refer to the same or like parts.

The relative index or relative refractive index of a segment, $\Delta\%$, as used herein, is defined by the equation, $$\Delta\% = 100 \times (n_i^2 - n_c^2)/2n_c^2$$

where $n_i$ is the maximum refractive index of the index profile segment denoted as i, and $n_c$, the reference refractive index, is taken to be the minimum index of the clad layer. Every point in the segment has an associated relative index. The "refractive index profile" is the relationship between refractive index or relative refractive index and waveguide fiber radius.

In cases where the refractive index of an annular region or a segment is less than the average refractive index of the cladding region, the relative index percent is negative and may be referred to as having a depressed region or depressed index, and is calculated at the point at which the relative index is most negative unless otherwise specified. In cases where the refractive index of an annular region or a segment is greater than the average refractive index of the cladding region, the relative index percent is positive and the region can be said to be raised or to have a positive index. A "downdopant" is herein considered to be a dopant which has a propensity to lower the refractive index relative to pure undoped $SiO_2$.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero.

A span of optical fiber as used herein includes a length of optical fiber, or a plurality of optical fibers optically connected, and preferably spliced or coupled together, serially. A span may comprise one or more sections of optical fiber as disclosed herein, and may further comprise one or more sections of other optical fiber, for example as selected to achieve a desired system performance or parameter such as residual dispersion at the end of a span. Thus, the plurality of optical fibers or fiber sections may extend between optical devices, for example between two optical amplifiers, or between a multiplexing device and an optical amplifier.

An optical transmission system may comprise a transmitter of light signals, a receiver of light signals, and a length of optical waveguide fiber or fibers having respective ends optically coupled to the transmitter and receiver to propagate light signals therebetween. The length of optical waveguide fiber can be made up of a plurality of shorter lengths that are spliced or connected together in end to end series arrangement. The system can include additional optical components such as optical amplifiers, optical attenuators, optical isolators, optical switches, optical filters, or multiplexing or demultiplexing devices.

The effective area is generally defined as, $$A_{eff}=2\pi(\int E^2 r\, dr)^2/(\int E^4 r\, dr)$$

wherein the integration limits are zero to $\infty$, and E is the electric field associated with the propagated light.

A first embodiment of an apparatus for transmitting an optical signal is shown by the block diagram of FIG. 1. The apparatus includes an optical transmitter 1 that generates an input optical signal to be transmitted from an input end to an output end of an optical fiber. An optical coupler 20 optically couples an optical receiver 2 and a pump light emitting device, preberably a Raman pump laser 3, to the output end of the optical fiber.

The term "$\alpha$-profile" or alpha profile of an optical fiber refers to a refractive index profile, expressed in terms of $\Delta(r)$ %, where r is radius, which follows the equation, $$\Delta(r)\ \% = \Delta(r_o)(1-[|r-r_o|/(r_1-r_o)]^\alpha),$$

where $r_o$ is the point at which $\Delta(r)$ % is maximum, $r_1$ is the point at which $\Delta(r)$ % is zero, and r is in the range $r_i \le r \le r_f$, where delta is defined above, $r_i$ is the initial point of the $\alpha$-profile, $r_f$ is the final point of the $\alpha$-profile, and $\alpha$ is an exponent which is a real number.

Referring to FIG. 1, the optical fiber span preferably comprises a section of NDNS fiber 5 optically coupled to a section of PDPS fiber 4. Preferably, NDNS fiber 5 comprises optical fiber with an $A_{eff}$ of not more than Optical transmitter 1 is optically coupled to the input of the optical fiber on the section of NDNS fiber 5. An input optical signal generated by optical transmitter 1, typically comprises wavelengths in the range of 1520 nm to 1610 nm.

The optical coupler 20 is optically coupled to an output of the optical fiber on the section of PDPS fiber 4. A pump light emitting diode (LED) (not shown) may be used in place of, or in addition to, Raman pump laser 3 to provide the amplification signal.

The optical receiver 2 is coupled to the section of PDPS fiber 4 by the optical coupler 20. The optical receiver 2 can be a conventional device for receiving optical signals.

Raman pump laser 3 generates an optical amplification signal, which travels in a direction that is counter propagating relative to the optical signal direction in the optical fiber. The amplification signal will typically have a wavelength in the range of 1400 nm to 1500 nm.

The intensity of the optical amplification signal can be described by the equation: Intensity=(Raman Pump Laser Light Power/$A_{eff}$). Single mode fiber 4 has a larger $A_{eff}$ than NDNS fiber 5, resulting in the intensity of the optical amplification signal being dramatically less in PDPS fiber 4 for the same amount of power provided by Raman pump laser 3. By reducing the intensity of the optical amplification signal along PDPS fiber 4, substantially less amplification of the input optical signal is achieved along PDPS fiber 4. Conversely, when the optical amplification signal reaches NDNS fiber 5, $A_{eff}$ Of the optical fiber is greatly reduced. Consequently, the intensity of the optical amplification signal increases, and larger amplification of the input optical signal results along the section of NDNS fiber 5.

By moving the NDNS fiber 5 with smaller $A_{eff}$ further from the output of the span (or closer to the transmitter or signal source), Raman gain is provided earlier for the optical signal, which improves Raman noise figure. Also, the proportion of Raman gain generated in NDNS fiber 5 is now smaller, which reduces multi-path interference (MPI). Required Raman pump powers are increased, thus reducing the possibility of pump depletion. Thus, an improvement is achieved by optically coupling PDPS optical fiber 4 with a large $A_{eff}$ to the Raman pump laser 3, rather than optically coupling a section of NDNS fiber to the Raman pump laser 3 as done in conventional optical communication systems.

Figure 2:
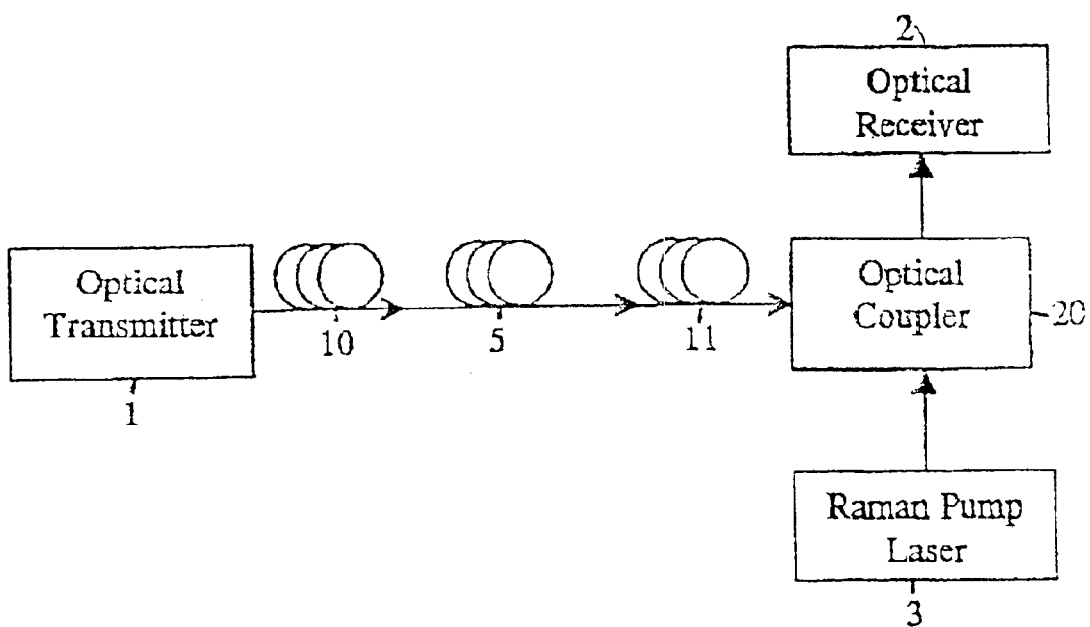
FIG. 2 is a block diagram of a second embodiment of a long-haul optical fiber system according to the present invention.

A second embodiment of an apparatus for transmitting an optical signal is shown by the block diagram of FIG. 2. This embodiment differs from the first embodiment only in that the optical fiber is comprised of a section of NDNS fiber 5 optically coupled between two sections of PDPS fibers 10 and 11. Preferably, larger $A_{eff}$ single mode fibers 10 and 11 are of approximately equal length.

The aforementioned advantages of moving small $A_{eff}$ fiber further from the output (or closer to the transmitter) are preserved in this second embodiment by coupling the pump laser 3 to the section of PDPS fiber 11 instead of to the NDNS fiber 5. The improved results as described for the first embodiment, however, are achieved to a higher degree by introduction of a second section of PDPS fiber 10 between the NDNS fiber 5 and the optical transmitter 1. Generally, amplification is desired after the input signal has lost some of its signal strength, which occurs some distance from the optical transmitter 1. By providing a section of PDPS fiber 10 optically coupled to the optical transmitter 1, the larger $A_{eff}$ of the PDPS fiber results in very little amplification of the input optical signal over the first section of PDPS fiber 10. This allows target amplification along a specific section of the optical fiber by placing the NDNS fiber 5 where large amplification is desired. Using the larger $A_{eff}$ of the PDPS fiber at the input of optical fiber reduces the signal degradation by nonlinear optical effects.

Preferably, the NDNS fiber has an effective area less than that of PDPS and greater than that of NDNS. The pump light emitting device is optically coupled to one of the sections of optical fiber wherein the pump light emitting device provides an amplification signal along the optical fiber.

The ratio of the combined lengths of the PDPS optical fiber sections to the NDNS optical fiber section is preferably greater than about 0.7, more preferably between about 0.7 and about 3, even more preferably between about 1.25 and about 3, and even still more preferably between about 1.25 and about 1.75. In one preferred embodiment, the ratio of the combined lengths of the PDPS optical fiber sections to the NDNS optical fiber section is between about 1.4 and about 1.6. In another preferred embodiment, the ratio of the combined lengths of the PDPS optical fiber sections to the NDNS optical fiber section is about 1.5.

Preferably, at least one of the optical fiber sections exhibits an attenuation of less than about 0.2 dB/km at a wavelength of 1550 nm.

Preferably, the NDNS optical fiber section exhibits an attenuation of less than about 0.3 dB/km at a wavelength of 1550 nm, more preferably less than about 0.26 dB/km at a wavelength of 1550 nm. Preferably, at least one and more preferably both, of the optical fiber sections exhibits a PMD of less than about 0.10 ps/km$^{1/2}$, more preferably less than about 0.05 ps/km$^{1/2}$, even more preferably less than about 0.01 ps/km$^{1/2}$.

Preferably, at least one, and more preferably both, of the optical fiber sections exhibits an attenuation of less than about 0.4 dB/km at a wavelength of 1380 nm, more preferably less than about 0.35 dB/km at a wavelength of 1380 nm.

Preferably, the combined length of the first PDPS optical fiber section, the second PDPS optical fiber section, and the NDNS optical fiber section is in the range of about 50 km to about 150 km, more preferably in the range of about 75 km to about 130 km, even more preferably between about 95 km and about 100 km. In a preferred embodiment, the combined length of a first PDPS optical fiber section, a second PDPS optical fiber section, and an NDNS optical fiber section is greater than about 75 km, more preferably greater than about 100 km. In one preferred embodiment, the first and second PDPS optical fiber sections have approximately equal lengths.

Preferably, the ratio of the effective area of at least one of the PDPS optical fiber sections to the effective area of the NDNS optical fiber section is not greater than about 4. In one preferred embodiment, the first and second PDPS optical fiber sections have equal effective areas. In a preferred embodiment, at a given wavelength, the second PDPS optical fiber sections has an effective area intermediate the respective effective areas of the first PDPS optical fiber section and the NDNS optical fiber section.

The apparatus may further include a plurality of optical devices disposed between the ends of the optical fiber span. For example, the apparatus may further include a dispersion compensating module (DCM) disposed at one of the ends of the optical fiber span.

A third embodiment of an apparatus for transmitting an optical signal comprises a first section of optical fiber, preferably a PDPS fiber, which preferably has a local dispersion of at least 10 ps/nm. Preferably, the first section of optical fiber has an $A_{eff}$ of at least 80 $\mu m^2$. The second section of optical fiber preferably comprises NDNS fiber, preferably having an $A_{eff}$ less than 30 $\mu m^2$. The third section of optical fiber preferably comprises optical fiber with an $A_{eff}$ less than that of the PDPS optical fiber section and greater than that of the NDNS optical fiber section. Preferably, the third section of optical fiber has an $A_{eff}$ in the range of 30 $\mu m^2$ to 80 $\mu m^2$.

The aforementioned advantages of the first embodiment also apply to this third embodiment. The use of PDPS fiber and NDNS fiber partially compensates for dispersion in the optical fiber along the optical transmission path and provides amplification earlier in the transmission path to reduce the amplification of noise.

Figure 3:
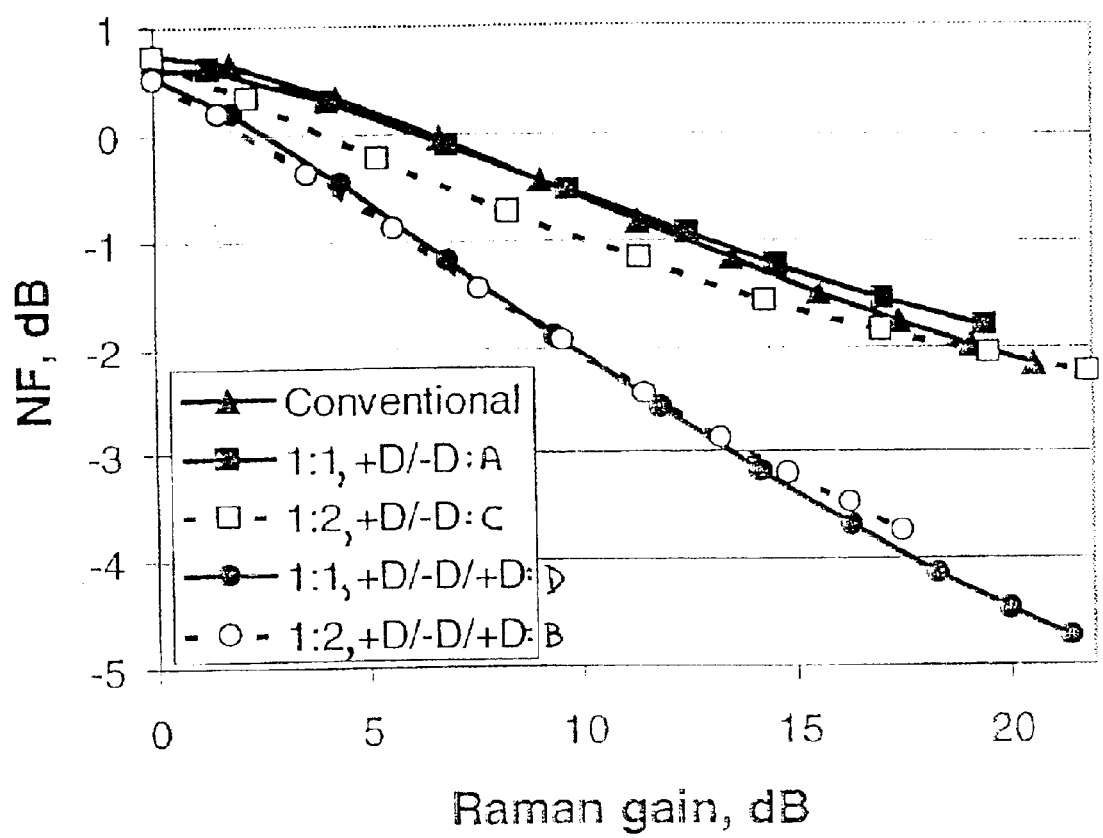
FIG. 3 is a chart showing experimental data comparing the first and second embodiments.

FIG. 3 shows a chart of the noise figure (NF) versus Raman gain comparing results obtained from experimental measurements on two configurations of optical fiber.

As used herein, "+D" refers to a PDPS fiber or fiber section, and "−D" refers to a NDNS fiber or fiber section The TYPE A and TYPE C configurations utilized an optical transmitter optically coupled to 50 km of PDPS fiber, which was optically coupled to 50 km of NDNS fiber.

The TYPE B and TYPE D configurations each had an optical fiber with 50 km NDNS fiber optically coupled between two 25 km sections of PDPS fiber, one of which was optically coupled to an optical transmitter.

Figure 8:
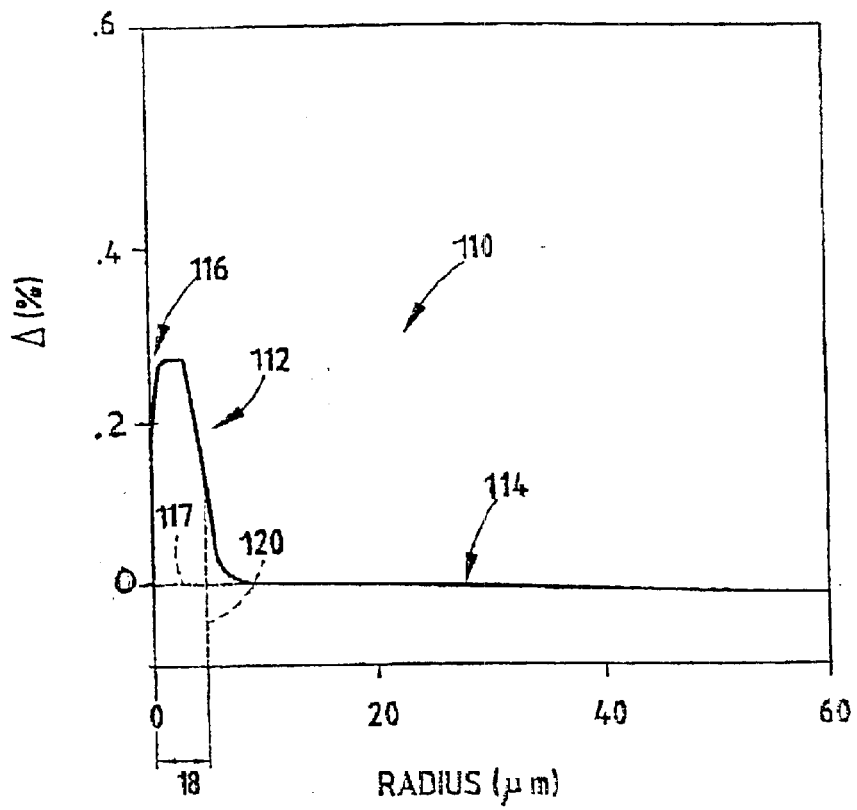
FIG. 8 shows the relative refractive index profile of a preferred embodiment of a PDPS fiber.

The PDPS fiber utilized in Types A and D configurations was a germania-doped silica step-index fiber having an effective area at 1550 nm of about 110 $\mu m^2$, a dispersion at 1550 nm of 18 to 19 ps/nm/km, dispersion slope of 0.06 ps/nm$^2$/km, and an attenuation at 1550 nm of about 0.19 dB/km. The refractive index profile of the PDPS fiber in the Types A and D configurations is represented by FIG. 8 and discussed below.

Figure 13:
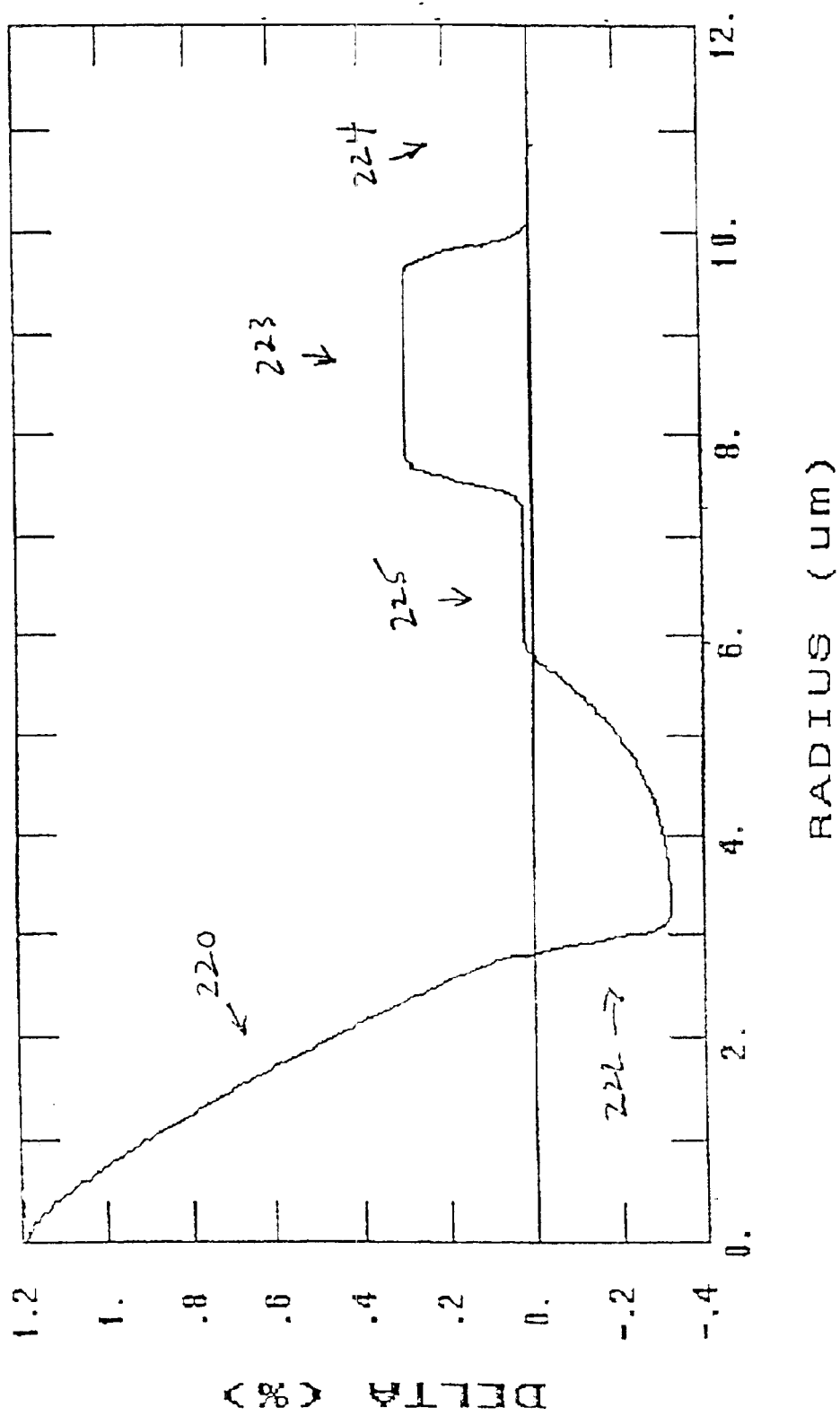
FIG. 13 shows the relative refractive index profile of still another preferred embodiment of an NDNS fiber.

The NDNS fiber utilized in the Types A and D configurations was a segmented core silica fiber having a germania-doped central core segment, a fluorine-doped moat segment, a ring segment preferably having an undoped (delta %=0) inner portion, and cladding. The NDNS fiber had an effective area at 1550 nm of about 25 to 27 $\mu m^2$, a dispersion at 1550 nm of about −14.4 to about −20.3 ps/nm/km, dispersion slope at 1550 nm of about −0.04 to −0.08 ps/nm$^2$/km, and an attenuation at 1550 nm of about 0.23 to 0.28 dB/km. The refractive index profile of the NDNS fiber in the Types A and D configuration is represented by FIG. 13 and discussed below.

Figure 9:
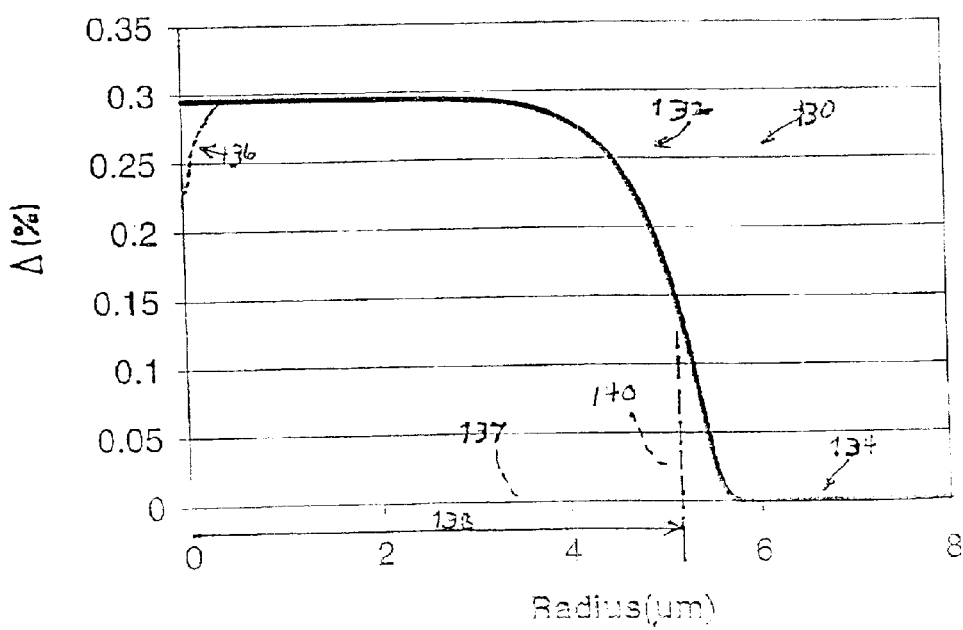
FIG. 9 shows the relative refractive index profile of another preferred embodiment of a PDPS fiber.

The PDPS fiber utilized in the Type B and Type C configuration was a germania-doped silica step-index fiber having an effective area of about 100 $\mu m^2$, a dispersion at 1550 nm of 18 to 19 ps/nm/km, dispersion slope of 0.06 ps/nm$^2$/km, and an attenuation at 1550 nm of about 0.19 dB/km. The refractive index profile of the PDPS fiber in the Type B and Type C configuration is represented by FIG. 9 and discussed below.

Figure 11:
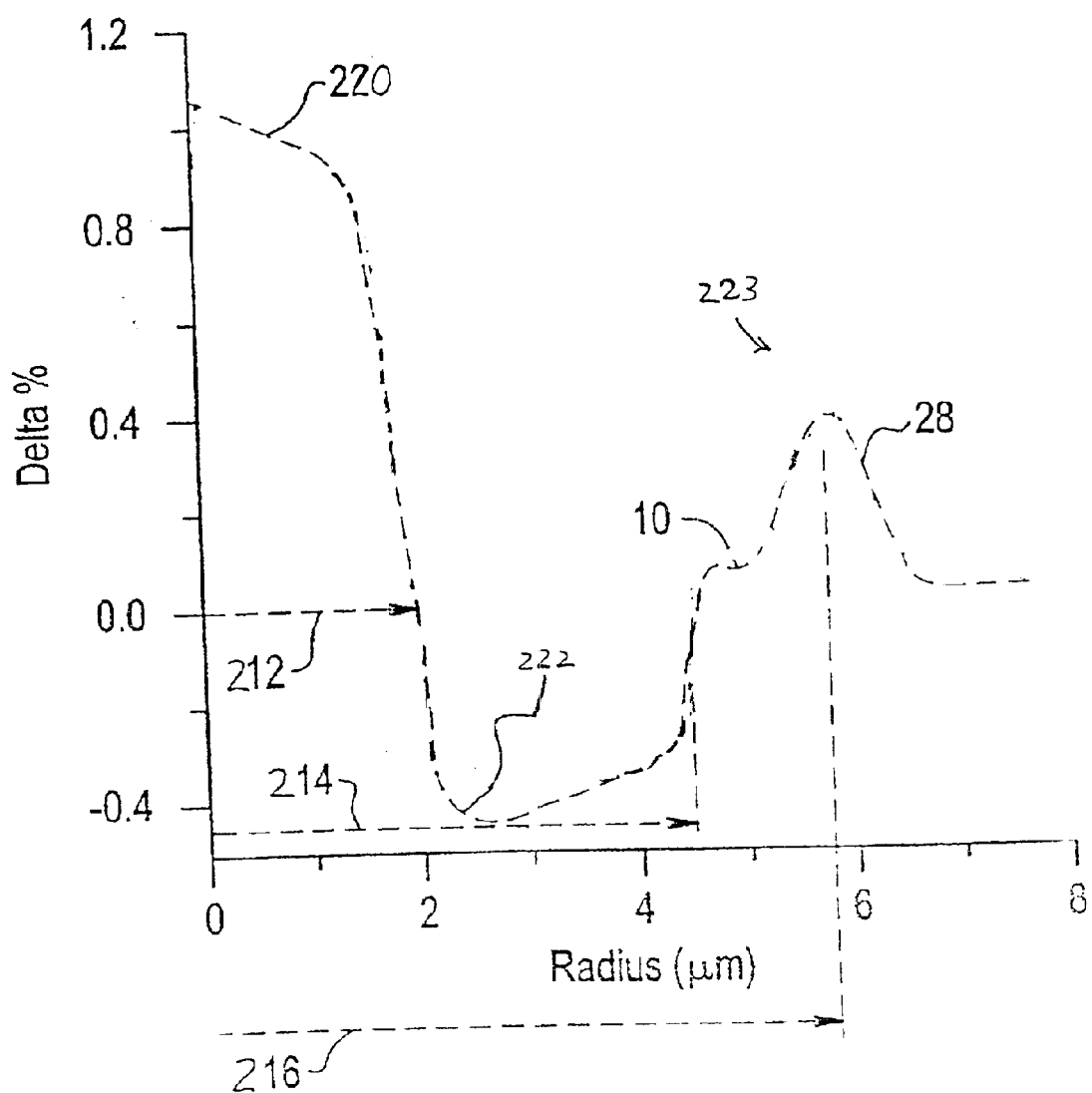
FIG. 11 shows the relative refractive index profile of another preferred embodiment of an NDNS fiber.

The NDNS fiber utilized in the Type B and Type C configurations was a segmented core silica fiber having a germania-doped central core segment, a fluorine-doped moat segment, a ring segment preferably having an undoped (delta % =0) inner portion, and cladding. The NDNS fiber had an effective area of about 26 to 28 $\mu m^2$, a dispersion at 1550 nm of about −40 to about −45 ps/nm/km, dispersion slope of about −0.09 to −0.10 ps/nm$^2$/km, and an attenuation at 1550 nm of about 0.25 to 0.26 dB/km. The refractive index profile of the NDNS fiber in the Type B and C configurations is represented by FIG. 11 and discussed below.

As shown in the chart, an improved NF was achieved using the TYPE B and TYPE D configurations, i.e. a section of NDNS fiber optically coupled between two sections of PDPS fiber. Hence, it is preferable to use at least a three section optical fiber as described above.

Figure 4:
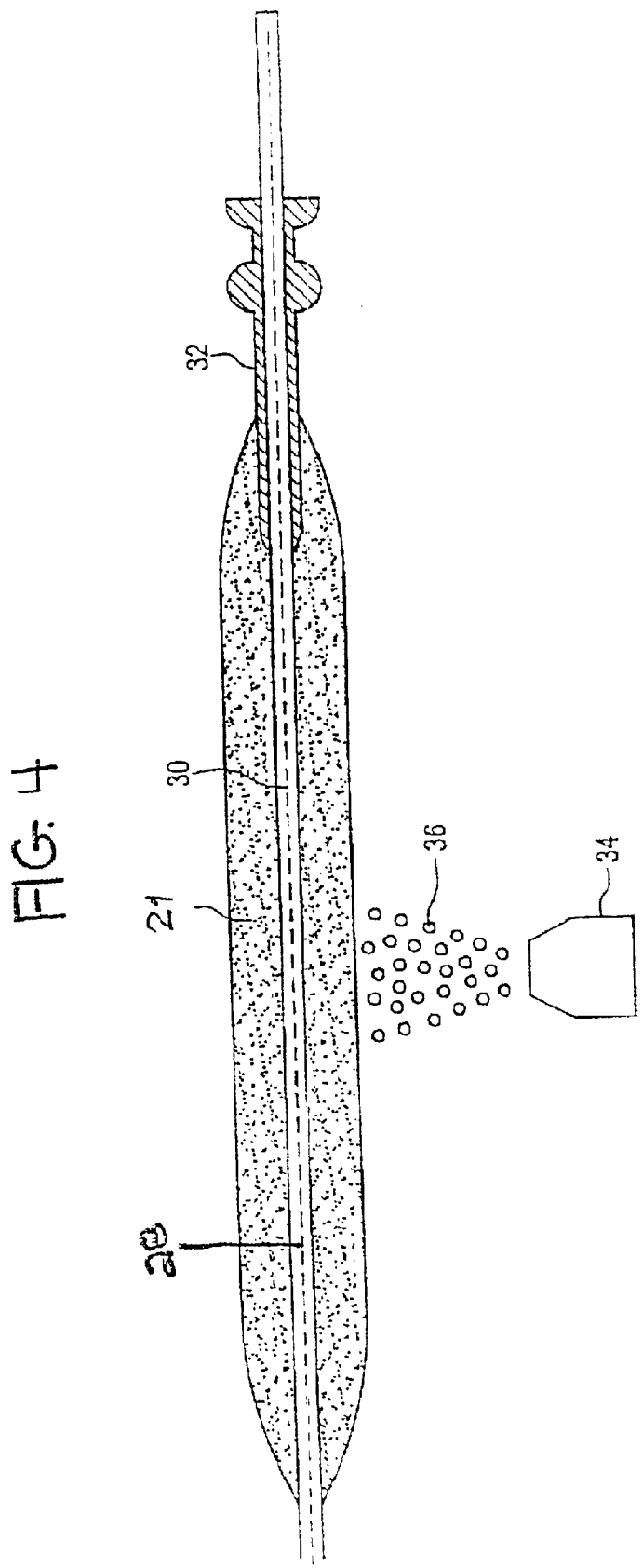
FIG. 4 is a schematic representation of laydown of a soot preform.

In a preferred embodiment, as illustrated by curves B and D of FIG. 4, the Raman noise figure of the optical fiber span is less than −2 dB for Raman gain of between about 10 dB and about 15 dB. In another preferred embodiment, the Raman noise figure of the optical fiber span is less than −3 dB for Raman gain of between about 12 dB and about 18 dB. In another preferred embodiment, the Raman noise figure of the optical fiber span is less than −4 dB for Raman gain of between about 18 dB and about 28 dB. In another preferred embodiment, the Raman noise figure of the optical fiber span is less than −4.5 dB for Raman gain greater than about 20 dB. In another preferred embodiment, the Raman noise figure of the optical fiber span is less than −5 dB for Raman gain greater than about 20 dB.

In another aspect, the present invention relates to an apparatus for transporting an optical signal comprising: an optical fiber span comprising first and second PDPS optical fiber sections, a NDNS optical fiber section disposed between said first and second PDPS optical fiber sections; and a pump light emitting device optically coupled to one of the PDPS optical fiber sections for providing Raman amplification to the optical fiber span, wherein the Raman noise figure of the optical fiber span is less than −2 dB for Raman gain of between about 10 dB and about 15 dB. Alternatively, the Raman noise figure of the optical fiber span is less than −3 dB for Raman gain of between about 12 dB and about 18 dB. Preferably, the apparatus exhibits a value for 20 log Q at a Raman gain of 20 dB which is higher than at a Raman gain of 12 dB.

The ratio of the total length of the PDPS fiber section(s) to the length of the NDNS section are preferably optimized to balance the aforementioned improvements and nonlinear-optical degradations that may occur. PDPS to NDNS length ratios of about 1:1, and about 2:1 were successfully shown to operate with the aforementioned improvements. Other length ratios will be readily apparent to one skilled in the art. Preferred ratios fall within the range of 0.7:1 to 3:1. Other preferred ranges of PDPS to NDNS length ratios include greater than about 1.25:1, more preferably between 1.25:1 to 3:1, even more preferably 1.25:1 to 1.75:1, yet more preferably 1.4:1 to 1.6:1. Modelling results show that ratios between about 1.25:1 and 1.75:1, for example 1.5:1, yield improved spectrum performance such as a reduction in nonlinearity at bit rates of 10 Gbit/s, with even more favorable performance at 40 Gbit/s and higher.

Preferably, the fiber sections in a span are selected and arranged to compress the optical signal at the signal-exiting end of an NDNS section relative to the state of the optical signal at its entry into a preceding PDPS fiber section. Thus, the NDNS fiber section has a length and dispersion at a signal wavelength which is sufficient to compress the optical signal pulse at that wavelength to a smaller width as compared to, i.e. beyond, its original width at the entry to a PDPS fiber optically coupled, to the NDNS fiber section.

Total length of optical fiber spans according to the embodiments of the present invention may also be optimized for particular transmission systems. A preferred total length ranges from 50 to 150 km, more preferably 75 to 130 km.

In one preferred embodiment, the present invention relates to an optical transmission system comprising at least two optically coupled optical fiber spans, each span comprising first and second positive dispersion optical fiber sections, each having a positive dispersion at a particular wavelength, and a negative dispersion optical fiber section having a negative dispersion at that particular wavelength and being disposed between said first and second positive dispersion optical fiber sections; and at least two pump light emitting devices for providing Raman amplification, including first and second Raman amplifiers, wherein the first Raman amplifier is optically coupled to one of the positive dispersion optical fiber sections of one of the optical fiber spans, and wherein the second Raman amplifier is optically coupled to one of the positive dispersion optical fiber section of another of the optical fiber spans; wherein the length of optical fiber between the first and second Raman amplifiers is greater than about 50 km. Preferably the Raman amplifiers are connected to the second positive dispersion optical fiber in each span.

Any of a number of optical devices could be incorporated in the optical transmission system. Such devices include, but are not limited to, optical repeaters, optical amplifiers, cross-connect nodes, optical regenerators, isolators, add drop multiplexers, branching units, Raman amplifiers and gain equalizing devices.

Preferably, the optical fiber transmission system includes no more than 5 erbium doped amplifiers, more preferably no more than 3 erbium doped amplifiers, and most preferably no erbium doped amplifiers. Preferably, the optical fiber transmission system is all-Raman-pumped.

In another aspect, the present invention relates to a method of transmitting an optical signal through such an optical transmission system while operating at a per-channel bit rate of 10 Gbit/sec.

In another aspect, the present invention relates to a method of transmitting an optical signal through an optical transmission system while operating at a per-channel bit rate of 40 Gbit/sec.

In another aspect, the present invention relates to a method of transmitting optical signals through an optical transmission system while operating at 3 or more wavelengths.

The system, and or a span, may include one or more sections of trim fiber which may be used, for example, to achieve a desired residual dispersion for a span or plurality of spans.

By way of example, a first PDPS optical fiber section has a dispersion of +20 ps/nm-km and a length of 30 km, a second PDPS optical fiber section has a dispersion of +20 ps/nm-km and a length of 30 km, and an NDNS optical fiber section has a dispersion of −30 ps/nm-km and a length of 40 km. The combined length of the first and second PDPS optical fiber sections and the NDNS optical fiber section is 100 km. The ratio of the combined lengths of the PDPS optical fiber sections to the NDNS optical fiber section is about 1.5. The ratio of the dispersion of the NDNS optical fiber sections to the dispersion of the PDPS optical fiber section is also about 1.5. The residual dispersion of the span is the sum of 60 km @ +20 ps/nm-km, or +1200 ps/nm, and 40 km @ −30 ps/nm-km, or −1200 ps/nm-km, i.e. about 0 (for a resonant map).

In another exemplary span, a first PDPS optical fiber section has a dispersion of +20 ps/nm-km and a length of 31 km, a second PDPS optical fiber section has a dispersion of +20 ps/nm-km and a length of 31 km, and an NDNS optical fiber section has a dispersion of −30 ps/nm-km and a length of 38 km. The combined length of the first and second PDPS optical fiber sections and the NDNS optical fiber section is 100 km. The ratio of the combined lengths of the PDPS optical fiber sections to the NDNS optical fiber section is about 1.63. The ratio of the dispersion of the NDNS optical fiber sections to the dispersion of the PDPS optical fiber section is also about 1.5. The residual dispersion of the span is the sum of 62 km @ +20 ps/nm-km, or +1240 ps/nm, and 38 km @ −30 ps/nm-km, or −1140 ps/nm-km, i.e. +100 ps/nm (for a nonresonant map). A trim fiber such as a dispersion compensation fiber (DCF) of length 1 km and dispersion of −110 ps/nm-km could be optically coupled (for example, in the form of a dispersion compensation module) to one end of the span, i.e. one of the PDPS fiber sections, to achieve a total residual dispersion of −10 ps/nm.

Thus, the ratio of the combined length of the first and second PDPS optical fiber sections to the length of the NDNS optical fiber section may differ from the ratio of the dispersion of the NDNS optical fiber section to dispersion of the PDPS optical fiber section. By way of example, a trim fiber may be utilized to account for any manufacturing variations in dispersion from fiber to fiber. Also, generally, less residual dispersion is desired in a span transmitting at 40 Gbit/sec compared to 10 Gbit/sec, as well as for increasing span distances.

Thus, one or more trim fibers may be provided to achieve a desired residual dispersion, or range of residual dispersions, for an optical span.

Exemplary optical fibers, or optical fiber sections, which are suitable for inclusion in a span are discussed below. Preferably, at least one, and more preferably all, of the optical fiber sections is made by an OVD process.

A low water peak optical fiber or optical fiber section is preferably included in a span. Methods of producing low water peak optical fiber can be found in U.S. application Ser. No. 09/722,804 filed Nov. 27, 2001, U.S. application Ser. No. 09/547,598 filed Apr. 11, 2000, U.S. Provisional Application Serial No. 60/258,179 filed Dec. 22, 2000, and U.S. Provisional Application Serial No. 60/275,015 filed Feb. 28, 2001, the contents of each being hereby incorporated by reference.

Soot preform or soot body 21, as exemplarily illustrated in FIG. 4, is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which includes hydrogen bonded to oxygen. The soot body may be formed, for example, by depositing layers of soot onto a bait rod via an OVD process. Such an OVD process is illustrated in FIG. 4.

As shown in FIG. 4 a substrate or bait rod or mandrel 30 is inserted through a glass body such as hollow or tubular handle 32 and mounted on a lathe (not shown). The lathe is designed to rotate and translate mandrel 30 in close proximity with a soot-generating burner 34. As mandrel 30 is rotated and translated, silica-based reaction product 36, known generally as soot, is directed toward mandrel 30. At least a portion of silica-based reaction product 36 is deposited on mandrel 30 and on a portion of handle 32 to form a body 21 thereon.

Once the desired quantity of soot has been deposited on mandrel 30, soot deposition is terminated and mandrel 30 is removed from soot body 21.

Figure 5:
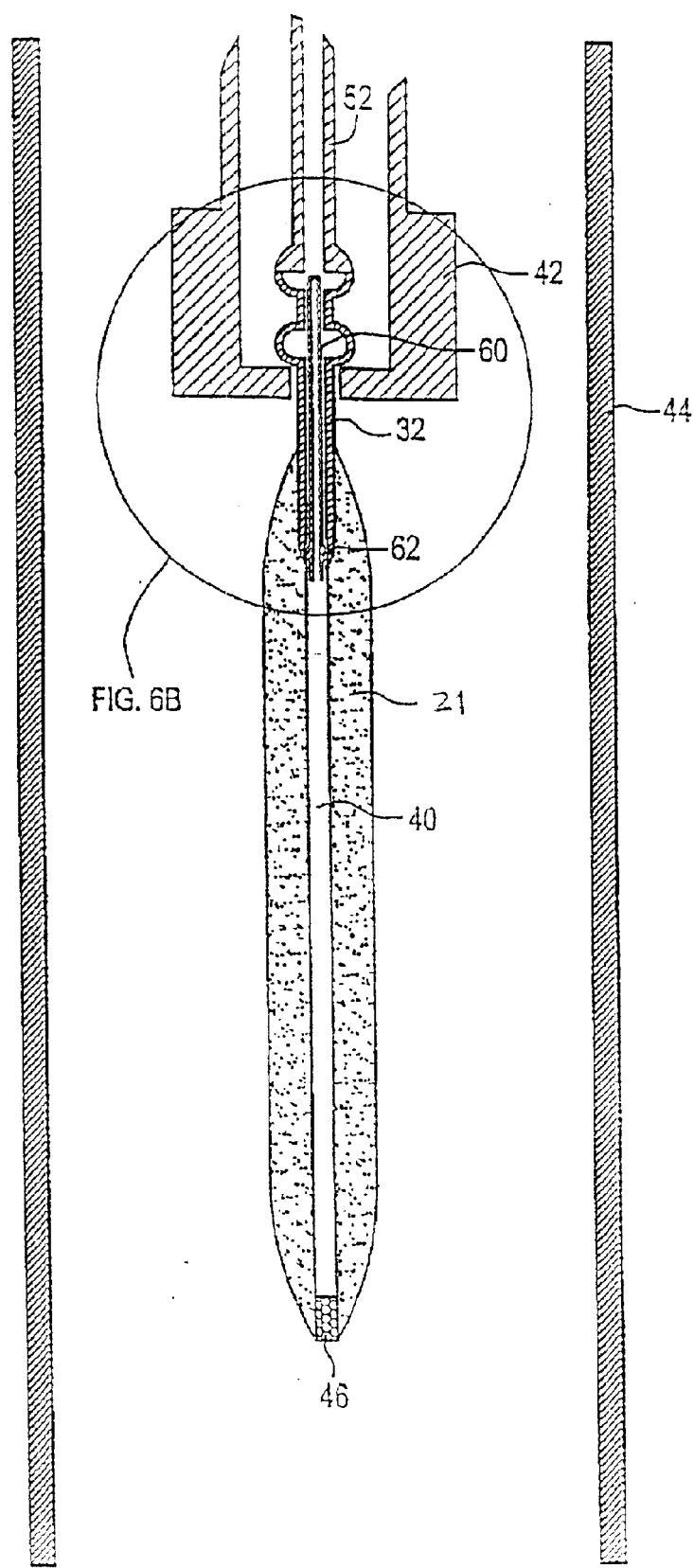
FIG. 5 is a schematic representation of a preform having both ends of its centerline hole plugged.
Figure 6:
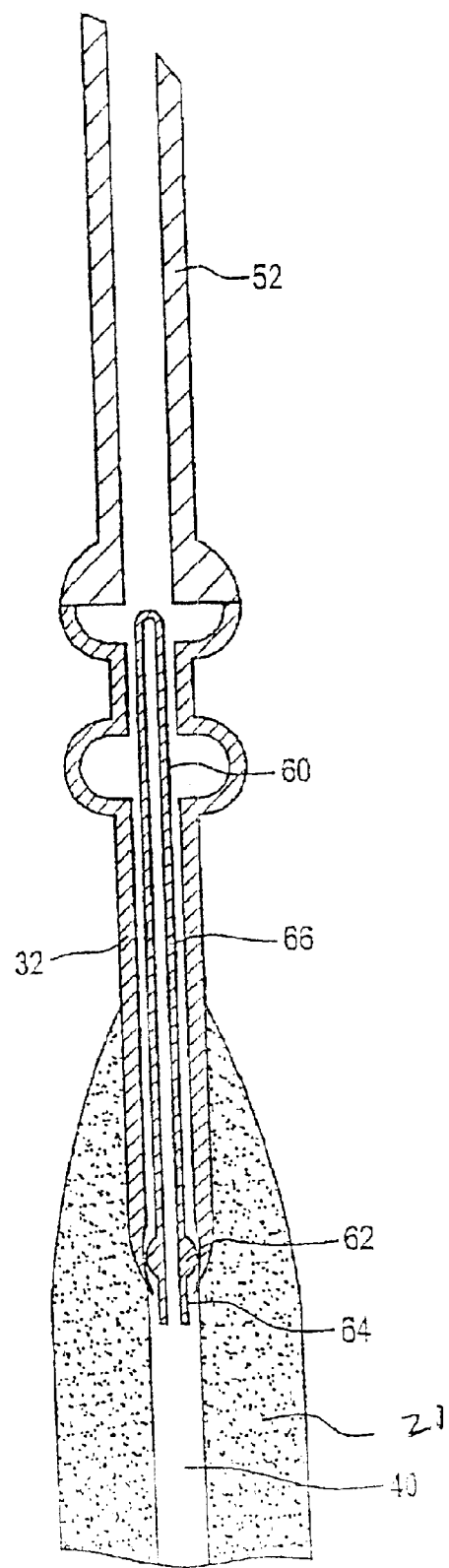
FIG. 6 is a closeup view of the plugged preform of FIG. 5 showing the top plug.

As depicted in FIGS. 5 and 6 upon removal of mandrel 30, soot body 21 defines a centerline hole 40 passing axially therethrough. Preferably, soot body 21 is suspended by handle 32 on a downfeed device 42 and positioned within a consolidation furnace 44. The end of centerline hole 40 remote from handle 32 is preferably fitted with a bottom plug 46 prior to positioning soot body 21 within consolidation furnace 44. Preferably, bottom plug 46 is positioned and held in place with respect to soot body 21 by friction fit. Plug 46 is further preferably tapered to facilitate entry and to allow at least temporary affixing, and at least loosely, within the soot body 21.

Soot body 21 is preferably chemically dried, for example, by exposing soot body 21 to a chlorine containing atmosphere at elevated temperature within consolidation furnace 44. Chlorine containing atmosphere 48 effectively removes water and other impurities from soot body 21, which otherwise would have an undesirable effect on the properties of optical waveguide fiber manufactured from soot body 21. In an OVD formed soot body 21, the chlorine flows sufficiently through the soot to effectively dry the entire blank, including the centerline region surrounding centerline hole 40.

Following the chemical drying step, the temperature of the furnace is elevated to a temperature sufficient to consolidate the soot blank into a sintered glass preform, preferably about 1500° C. The centerline hole 40 is closed during the consolidation step. In a preferred embodiment, the centerline region has a weighted average OH content of less than about 1 ppb.

Preferably, exposure of the centerline hole to an atmosphere containing a hydrogen compound is significantly reduced or prevented by closing the centerline hole during consolidation.

In a preferred embodiment, a glass body such as bottom plug 46 is positioned in centerline hole 40 at the end of soot body 21 remote from handle 32, and a glass body such as hollow tubular glass plug or top plug 60 having a open end 64 is positioned in centerline hole 40 in soot body 21 opposite plug 46 as shown in FIG. 5. Top plug 60 is shown disposed within the cavity of tubular handle 32. Following chlorine drying, soot body 21 is down driven into the hot zone of consolidation furnace 44 to seal centerline hole 40 and consolidate soot body 21 into a sintered glass preform. Drying and consolidation may optionally occur simultaneously. During consolidation, soot body 21 contracts somewhat and engages bottom plug 46 and the lower end of top plug 60, thereby fusing the resulting sintered glass preform to plug 46 and plug 60 and sealing the centerline hole 40. Sealing of both the top and bottom of centerline hole 40 can be accomplished with one pass of soot body 21 through the hot zone. Preferably, sintered glass preform is held at an elevated temperature, preferably in a holding oven, to allow inert gas to diffuse from centerline hole 40 to form a passive vacuum within sealed centerline hole 40. Preferably, top plug 60 has a relatively thin wall through which diffusion of the inert gas can more expediently occur. As depicted in FIG. 6 top plug 60 preferably has an enlarged portion 62 for supporting plug 60 within handle 32, and a narrow portion 64 extending into centerline hole 40 of soot body 21. Plug 60 also preferably includes an elongated hollow portion 66 which may preferably occupy a substantial portion of handle 32. Hollow portion 66 provides additional volume to centerline hole 40 thereby providing a better vacuum within centerline hole 40 following diffusion of the inert gas.

The volume provided by elongated portion 66 of plug 60 provides added volume to sealed centerline hole 40, advantages of which will be described in greater detail below.

As described above and elsewhere herein, bottom plug 46 and top plug 60 are preferably glass bodies having a water content of less than about 30 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 μm to about 2 mm. Even more preferably, at least a portion of plug 60 has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Figure 7:
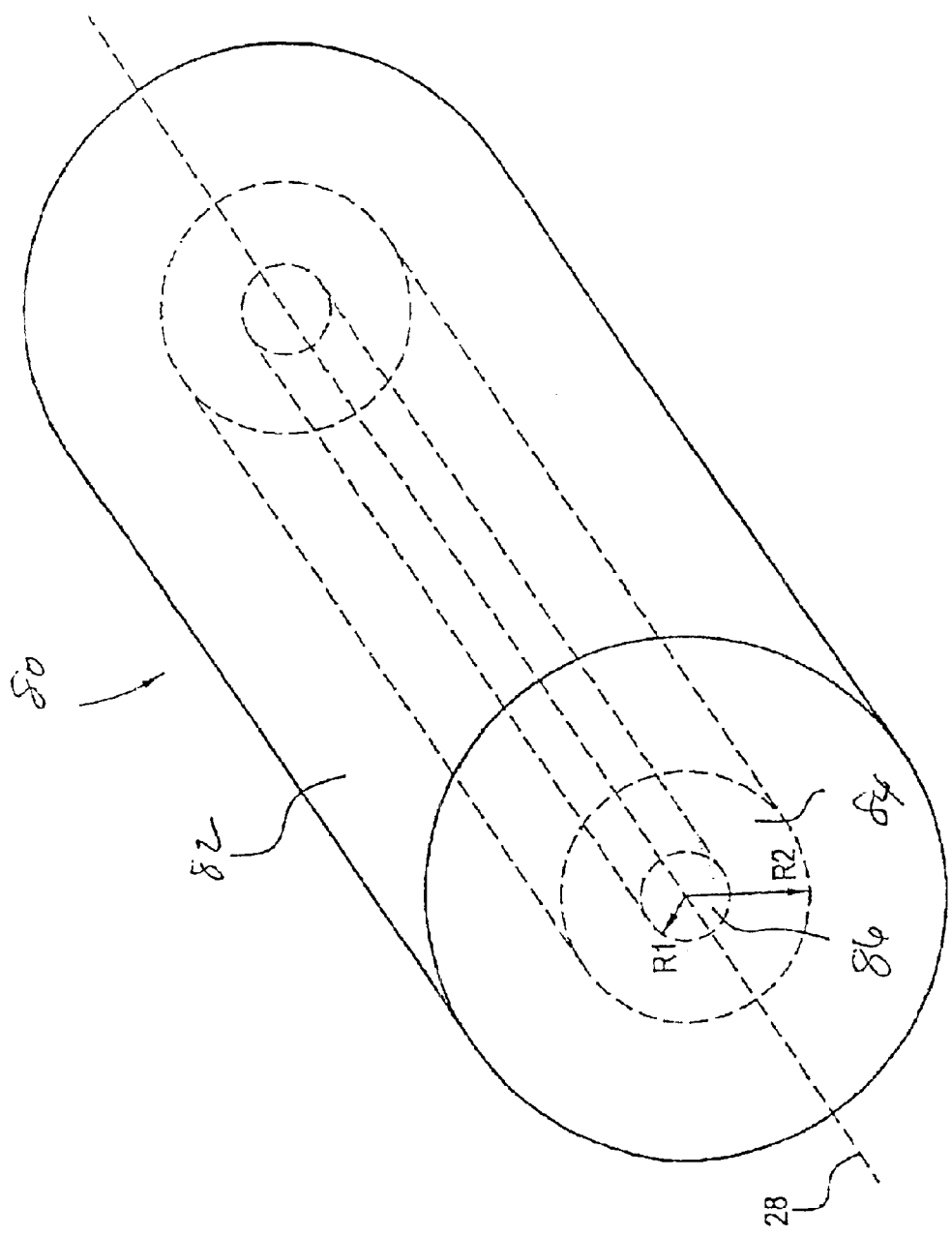
FIG. 7 is a schematic representation of a preform or an optical fiber having a closed centerline region.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or redraw) process. FIG. 7 shows a representative isometric section of an optical fiber 80 having a centerline axis 28, a core portion 86 having a radius Ri, surrounded by an inner cladding portion 84 having a radius Rj, surrounded by an overcladding portion 82.

Consequently, overall lower O-H overtone optical attenuation can be achieved. For example, the water peak at 1383 nm, as well as at other OH induced water peaks, such as at 950 nm or 1240 nm, can be lowered according to the present invention, and even virtually eliminated.

In at least one preferred embodiment, the centerline region 84 contains no fluorine dopant. In another preferred embodiment, the dopant containing region 86 contains no fluorine dopant. In yet another preferred embodiment, the region surrounding centerline region 84 contains no fluorine dopant. In still another preferred embodiment, the cylindrical glass body 21 contains no fluorine dopant.

In at least one preferred embodiment, the cylindrical glass body 21 contains no phosporus.

In another preferred embodiment, the core and cladding each have a respective refractive index which form a step-index profile.

Preferably, the optical fibers discussed herein exhibit low polarization mode dispersion (PMD) values, which can be achieved by fabrication by OVD processes, such as the methods and apparatus found in U.S. Provisional Application Serial No. 60/309,160 filed Jul. 31, 2001. Additional methods and apparatus for adjusting the pressure in the centerline aperture region of a preform can be found in U.S. application Ser. No. 09/558,770, filed Apr. 26, 2000, entitled "An Optical Fiber and a Method for Fabricating a Low Polarization-Mode Dispersion and Low Attenuation Optical Fiber", and in U.S. Provisional Application No. 60/131,033, filed Apr. 26, 1999, entitled "Low Water Peak Optical Waveguide and Method of Manufacturing Same", all of which are incorporated herein by reference.

The positive dispersion single mode fiber preferably has a step-index refractive index profile with a germania-doped silica core. Preferably, at least one of the PDPS optical fiber sections has no fluorine.

Preferably, the effective area of the positive dispersion single mode fiber is greater than or equal to about 80 $\mu m^2$, more preferably greater than or equal to about 90 $\mu m^2$, and even more preferably between about 95 $\mu m^2$ and about 110 $\mu m^2$, and still more preferably between about 95 $\mu m^2$ and 105 $\mu m^2$. Thses effective areas of the positive dispersion single mode fiber correspond to a wavelength of 1550 nm.

The PDPS fiber preferably exhibits an attenuation at a wavelength of about 1550 nm of less than or equal to about 0.2 dB/km, more preferably less than or equal to about 0.19 dB/km.

In preferred embodiments, the positive dispersion single mode fiber exhibits a total dispersion at a wavelength of about 1560 nm of preferably within the range of about 16 ps/nm-km to about 22 ps/nm-km. Total dispersion, usually referred to as dispersion, is defined as the algebraic sum of waveguide dispersion and material dispersion. Total dispersion for single-mode fibers is also referred to as chromatic dispersion in the art. The units of total dispersion are ps/nm-km.

The total dispersion slope at a wavelength of about 1550 nm of the PDPS fiber is preferably less than or equal to about 0.09 ps/nm$^2$-km, more preferably between about 0.045 ps/nm$^2$-km and about 0.075 ps/nm$^2$-km.

Preferably, the attenuation of the PDPS fiber at a wavelength of about 1380 nm is less than or equal to about 0.4 dB/km, more preferably less than or equal to about 0.35 dB/km, and even more preferably the attenuation at a wavelength of about 1380 nm is less than or equal to the attenuation at a wavelength of about 1310 nm.

Preferably, the polarization mode dispersion (PMD) exhibited by the PDPS fiber is less than about 0.1 ps/km$^{1/2}$ (unspun), more preferably less than about 0.05 ps/km$^{1/2}$ (unspun). Spinning the fiber could lower PMD values even more.

Preferably, the PDPS fiber is made by a vapor deposition process. Even more preferably, the fiber is made by an outside vapor deposition (OVD) process. Thus, for example, OVD laydown and draw techniques may be advantageously used to produce the fiber of the present invention. Other processes, such as modified chemical vapor deposition (MCVD) may be used. Thus, the refractive indices and the cross sectional profile of the positive dispersion single mode fibers can be accomplished using manufacturing techniques known to those skilled in the art including, but in no way limited to, OVD and MCVD processes.

One preferred embodiment of the refractive index profile is depicted in FIG. 8 which shows the relative refractive index percent ($\Delta\%$) charted versus waveguide radius. The core 112, as referred to herein, can thus be described by a refractive index profile, relative refractive index percent, $\Delta_1\%$, and an outside radius, $r_1$. As seen in FIG. 8, the clad layer has a refractive index of $n_c$ surrounding the core, wherein the outside radius $r_1$ of the core can be measured at a half-maximum point. That is, the outer radius 118, $r_1$, of the core 112 illustrated is about 5.15 $\mu$m as measured from the fiber centerline to the vertical line depending from the half maximum relative index point of the descending portion of core 112. The half maximum point is determined using the clad layer, i.e., $\Delta\%=0$, as referenced, shown by dashed line 117. In FIG. 8, the core 112 has a peak refractive index or maximum relative index $\Delta_1\%$ of about 0.295%, thus, relative to the $\Delta\%=0$ of the clad layer, the magnitude is about 0.295%. Dashed vertical line 20 depends from the 0.1475% point, which is half of the maximum magnitude of $\Delta_1\%$.

Line 114 of FIG. 8 represents the refractive index of the cladding which is used to calculate the refractive index percentage of the segments. Diffusion of dopant during manufacturing of waveguide fiber may cause rounding of the corners of the profiles, as illustrated in FIG. 8, and may cause a center line refractive index depression as represented by dotted line 116. It is possible, but often not necessary, to compensate somewhat for such diffusion, for example, in the doping step.

In another preferred embodiment, the PDPS fiber has the refractive index profile depicted in FIG. 9. The outer radius 138, $r_1$, of the core 132 illustrated is about 5.57 $\mu$m as measured from the fiber centerline to the vertical line depending from the half maximum relative index point of the descending portion of core 132. The half maximum point is determined using the clad layer, i.e., $\Delta\%=0$, as referenced, shown by dashed line 137. In FIG. 9, the core 132 has a peak refractive index or maximum relative index $\Delta_1\%$ of about 0.27%, thus, relative to the $\Delta\%=0$ of the clad layer, the magnitude is about 0.27%. Dashed vertical line 140 depends from the 0.135% point, which is half of the maximum magnitude of $\Delta_1\%$.

U.S. Provisional Application Serial No. 60/254,909 filed Dec. 12, 2000, and U.S. Provisional Application Serial No. 60/276,350 filed Mar. 16, 2001, both of which are incorporated by reference herein, describe other preferred embodiments of a positive dispersion single mode fiber.

The NDNS fiber or fiber section preferably has negative dispersion and negative dispersion slope over the operating wavelength range. Preferred embodiments of suitable NDNS fiber are represented by the relative refractive index profiles illustrated in FIGS. 10 to 13. These fibers may have index profiles formed from various dopants, wherein those represented in FIGS. 10-13 preferably comprise both germania and fluorine doped core regions. The fibers illustrated in FIGS. 10-13 have at least three segments and a cladding. The control segment and a second annular core segment are preferably Ge-doped, while a first annular core segment is preferably F-doped. The first annular segment is typically referred to as a "moat" region. Cladding is preferably (undoped) silica.

Figure 10:
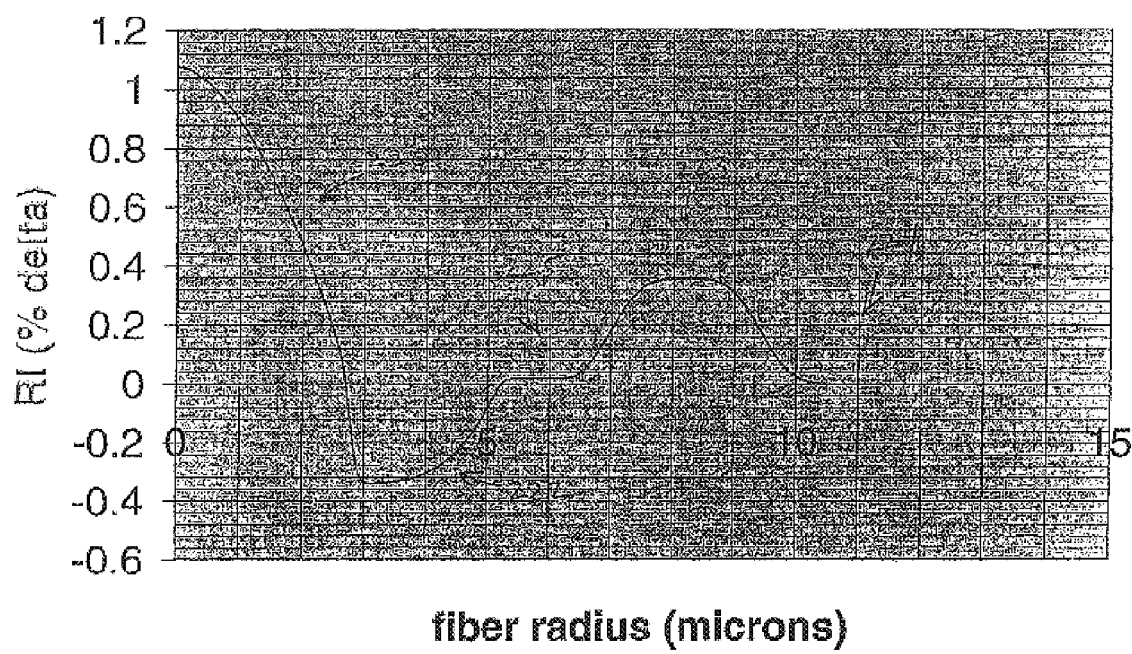
FIG. 10 shows the relative refractive index profile of a preferred embodiment of an NDNS fiber.

Referring to FIG. 10, the NDNS preferably comprises: a central core region comprised of a central core segment 220; a first annular core segment or moat 222 adjacent and surrounding the central core segment 220; a second annular core segment 223 adjacent and surrounding the first annular core segment 222; and an outer annular cladding region 224 adjacent and surrounding the second annular core segment 223. The second annular core segment preferably includes a flattened region adjacent the first annular core segment. Preferably, the NDNS optical fiber section has an effective area of between about 20 and about 40 $\mu m^2$ at 1550 nm. In one preferred embodiment, the NDNS optical fiber section has an effective area of between about 25 and about 30 $\mu m^2$ at 1550 nm.

Preferably, the polarization mode dispersion (PMD) exhibited by the NDNS is less than about 0.1 $ps/km^{1/2}$ (unspun), more preferably less than about 0.05 $ps/km^{1/2}$ (unspun). Spinning the fiber could lower PMD values even more. NDNS with low PMD can be advantageously made by, for example, an outside vapor deposition (OVD) process.

Preferably, germanium and silica soot is deposited upon a substrate during laydown to produce soot preform. The soot preform is then heated, dried, consolidated, and drawn into a reduced diameter preform, or cane preform. The preform may be heated and drawn a plurality of times into a progressively smaller diameter preform.

Preferably, additional material comprising one or more layers of fluorine-doped silica soot is then applied to the reduced diameter preform, for example by laydown of silica soot followed by fluorine doping with $CF_4$. The additional material will form another segment of the fiber core, namely the moat. The preform comprised of both consolidated glass and silica soot is then heated, dried, consolidated, and drawn into a reduced diameter preform, or cane preform. The silica soot may be doped during laydown, prior to consolidation, or during consolidation. Further material comprising one or more layers of silica soot and/or germania-doped silica soot is then applied to the reduced diameter preform by an additional laydown step. Undoped silica soot may be applied to form, for example, a flattened region wherein Δ% equal to 0.0, either adjacent the moat or spaced away from the moat to serve as cladding. The further material will form yet another segment of the fiber core, the ring. The ring segment may comprise cladding at its periphery. The preform comprised of both consolidated glass and silica soot is then heated, dried, consolidated, and drawn into a reduced diameter preform, or cane preform.

Preferably, additional silica soot is then applied to the reduced diameter preform to add cladding material thereto. The preform comprised of both consolidated glass and silica soot is then heated, dried, consolidated, and drawn, either into another reduced diameter preform or directly into optical fiber.

Thus, OVD laydown and draw techniques may be advantageously used to produce the NDNS fiber.

The NDNS fiber preferably comprises a central core segment having a refractive index profile with an alpha of between 1.0 and 2.5, more preferably between about 1.5 and about 2.0. Higher values of alpha yield more negative dispersion, i.e. greater absolute value of dispersion, although lower values of alpha yield lower attenuation losses. Attenuation losses are typically a significant factor in long haul optical fiber networks.

Referring again to FIG. 10, in one preferred aspect, the NDNS fiber comprises three core segments: center core segment 220, first annular core segment or moat 222, and second annular core segment or ring 223. Preferably, center core segment 220 comprises a maximum relative refractive index or peak Δ or $\Delta_1$% between 0.8 and 1.4, more preferably between 0.9 and 1.3, even more preferably between 1.0 and 1.2, and a half-peak height radius of between about 1 and 2.5 $\mu m$, more preferably between about 1.5 and 2.25 $\mu m$. The central core segment ends and the first annular core segment begins where the relative refractive index changes from positive to negative at a radius of between about 1.5 and 3.5 $\mu m$, more preferably between about 2 and about 3 $\mu m$. The first annular core segment 222 comprises a minimum depression Δ or $\Delta_2$% between -0.1 and -0.5, more preferably between -0.2 and -0.4. The moat ends and the ring begins, i.e. where the relative refractive index changes from negative to positive, at a radius of between about 3.5 and 6.5 $\mu m$, more preferably between about 4 and about 6 $\mu m$. Preferably, the second annular core segment or ring includes a flattened region having a relative refractive index preferably between 0.0 and 0.2, more preferably between 0.0 and 0.1, and even more preferably essentially 0. Second annular core segment or ring 223 has a peak Δ% or $\Delta_3$% of between about 0.2 and 0.5, more preferably between about 0.25 and 0.4. Second annular core segment 223 ends where the Δ% falls to 0%. The outer annular cladding region or cladding segment 224 is disposed adjacent and surrounding second annular core segment 223, and preferably begins at a radius of between about 6 and 12 $\mu m$, more preferably between about 7 and 11 $\mu m$.

In the first aspect, the NDNS fiber preferably exhibits a total dispersion at 1550 nm in the range of -30 ps/nm-km to -60 ps/nm-km, more preferably -30 ps/nm-km to -50 ps/nm-km, total dispersion slope at 1550 nm in the range of -0.09 $ps/nm^2$-km to -0.18 $ps/nm^2$-km, more preferably -0.09 $ps/nm^2$-km to -0.15 $ps/nm^2$-km, attenuation at 1550 nm less than or equal to 0.30 dB/km, more preferably less than or equal to 0.26 dB/km, and effective area at 1550 nm in the range of 24 $\mu m^2$ to 30 $\mu m^2$.

In one preferred embodiment, the NDNS fiber has a central core segment 220 with a $\Delta_1$% of about 1.1% and an alpha of about 1.5. Central core segment 220 has a half-peak height radius of about 1.9 $\mu m$. The end of central core segment 220 and the beginning of first annular core segment 222 in FIG. 10 is about 2.8 $\mu m$ where the relative refractive index profile of the central core segment intersects with the Δ%=0 axis. The first annular core segment 222 comprises a minimum depression Δ or $\Delta_2$% of about -0.3. The moat 222 ends and the ring 223 begins where the relative refractive index changes from negative to positive at a radius of about 5 $\mu m$. The second annular core segment or ring 223 includes a flattened region having a relative refractive index preferably of essentially 0.0 at a radius between about 5 and 6.5 $\mu m$. Second annular core segment or ring 223 has a peak Δ% or $\Delta_3$% of about 0.27. Second annular core segment 223 ends where the Δ% falls to essentially 0%. The outer annular cladding region or cladding segment 224 is disposed adjacent and surrounding second annular core segment 223, and preferably begins at a radius of about 11 $\mu m$. The outer annular cladding region 224 preferably consists of pure silica.

A so-called "centerline depression" may be present in the NDNS fiber, and may occur from a radius of 0.0 to about 0.2 $\mu$m as a result of the particular method of manufacture of the fiber.

In another preferred embodiment, the NDNS fiber had a refractive index profile as shown in FIG. 11. Central segment 220 has $\Delta_o\%$ of 1.05%, outside radius 212 of 2 $\mu$m, first annular segment or moat 222 has $\Delta_1\%$ of −0.42 %, outer radius 214 of 4.6 $\mu$m; second annular segment 223 has a flattened region 225 of width 0.3 $\mu$m and relative index near zero, and a raised index region $\Delta_2\%$ of 0.4%, center radius 216 of 5.3 $\mu$m, width of 1.0 $\mu$m, and a symmetrical rounded shape.

The optical waveguide fiber exhibited an effective area of 26 $\mu m^2$, total dispersion at 1550 nm of −40 ps/nm-km, total dispersion slope at 1550 nm of −0.11 ps/nm$^2$-km, and attenuation at 1550 nm of 0.255 dB/km.

Figure 12:
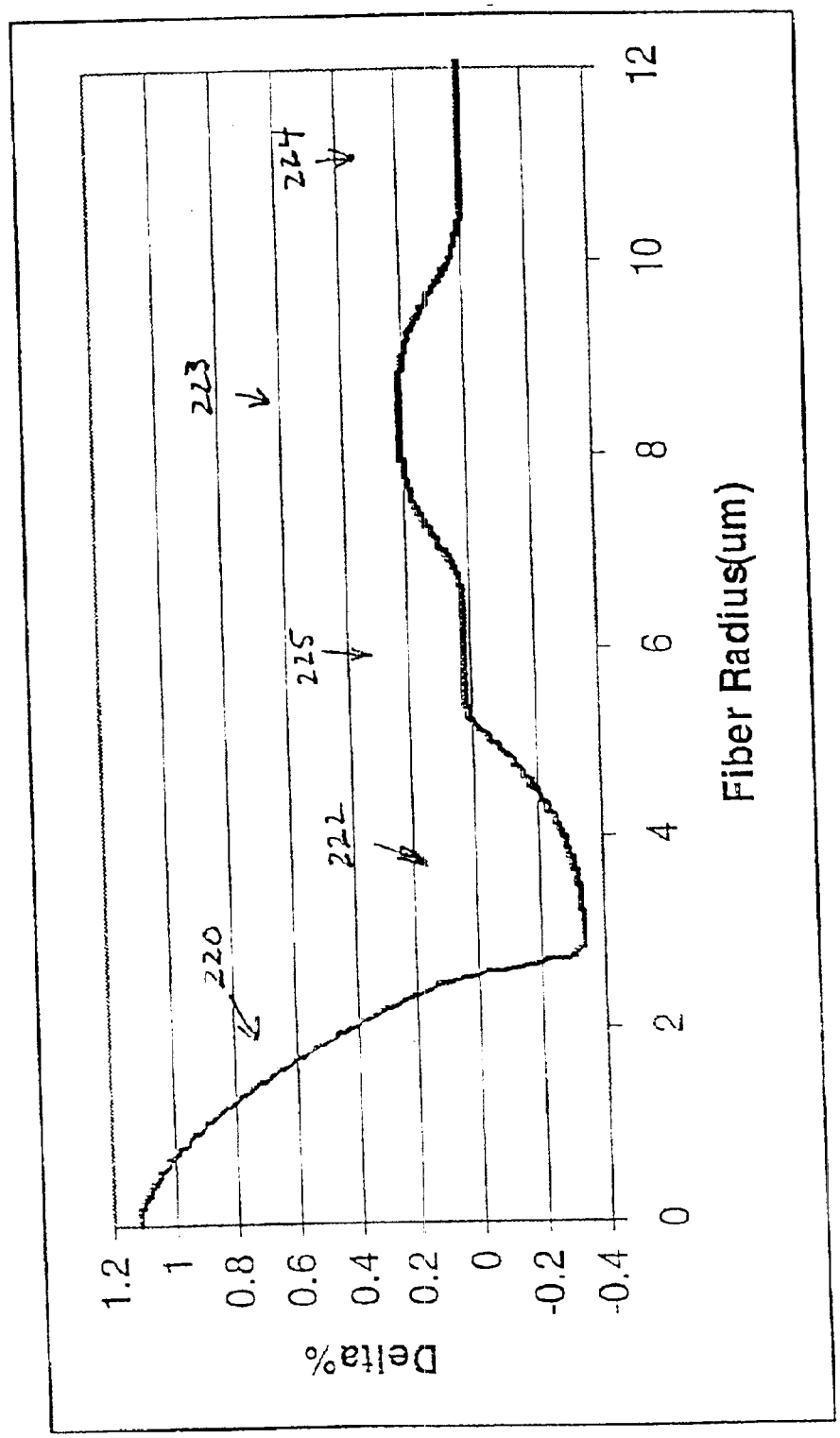
FIG. 12 shows the relative refractive index profile of yet another preferred embodiment of an NDNS fiber.

Referring to FIG. 12, in another preferred aspect, the NDNS fiber comprises three core segments: center core segment 220, first annular core segment or moat 222, and second annular core segment or ring 223. Preferably, center core segment 220 comprises a maximum relative refractive index or peak $\Delta$ or $\Delta_1\%$ between 0.8 and 1.7, more preferably between 0.9 and 1.5, even more preferably between 1.0 and 1.2, and a half-peak height radius of between about 1 and 2.5 $\mu$m, more preferably between about 1.5 and 2.25 $\mu$m. Preferably the central core segment 220 has an alpha of between 1 and 2, more preferably between 1.5 and 2. The central core segment 220 ends and the first annular core segment 222 begins where the relative refractive index changes from positive to negative at a radius of between about 1.5 and 4 $\mu$m, more preferably between about 2.2 and about 3.2 $\mu$m. The first annular core segment 222 comprises a minimum depression $\Delta$ or $\Delta_2\%$ between −0.1 and −0.5, more preferably between −0.28 and −0.45. The moat 222 ends and the ring 223 begins where the relative refractive index changes from negative to positive at a radius of between about 4 and 7 $\mu$m, more preferably between about 4.5 and about 6.5 $\mu$m. Preferably, the second annular core segment or ring 223 includes a flattened region 225 having a relative refractive index preferably between 0.0 and 0.2, more preferably between 0.0 and 0.1, and even more preferably essentially 0. Second annular core segment or ring 223 has a peak $\Delta\%$ or $\Delta_3\%$ of between about 0.235 and 0.55, more preferably between about 0.27 and 0.5. Second annular core segment 223 ends where the $\Delta\%$ falls to essentially 0%. The outer annular cladding region or cladding segment 224 is disposed adjacent and surrounding second annular core segment 223, and preferably begins at a radius of between about 6 and 12 $\mu$m, more preferably between about 7.5 and 11 $\mu$m.

Referring again to FIG. 12, in one preferred embodiment, the NDNS fiber comprises three core segments: center core segment 220, first annular core segment or moat 222, and second annular core segment or ring 223. Center core segment 220 comprises a maximum relative refractive index or peak $\Delta$ or $\Delta_1\%$ of 1.1, an alpha of about 1.7 and a half-peak height radius of between about 1.8 $\mu$m. The central core segment 220 ends and the first annular core segment 222 begins where the relative refractive index changes from positive to negative at a radius of about 2.5 $\mu$m. The first annular core segment 222 comprises a minimum depression $\Delta$ or $\Delta_2\%$ of −0.35. The moat 222 ends and the ring 223 begins where the relative refractive index changes from negative to positive at a radius of about 5.3 $\mu$m. The second annular core segment or ring 223 includes a flattened region 225 having a relative refractive index of essentially 0 generally extending from a radius of about 5 $\mu$m to about 6.5 $\mu$m. Second annular core segment or ring 223 has a peak $\Delta\%$ or $\Delta_3\%$ of about 0.21. Second annular core segment 223 ends where the $\Delta\%$ falls to essentially 0%. The outer annular cladding region or cladding segment 224 is disposed adjacent and surrounding second annular core segment 223, and begins at a radius of about 10.5 $\mu$m. Additional cladding material can be added to the cladding segment, either by CVD process, rod-in-tube methods, or other known methods.

In this aspect, the NDNS fiber preferably has, at 1550 nm, a total dispersion in the range from −12 ps/nm-km to −35 ps/nm-km, a total dispersion slope in a range from −0.04 ps/nm$^2$-km to −0.11 ps/nm$^2$-km, and a polarization mode dispersion less than 0.10 ps/km$^{1/2}$. Preferably, the polarization mode dispersion is less than 0.05 ps/km$^{1/2}$, and more preferably less than 0.01 ps/km$^{1/2}$. Attenuation at 1550 nm is less than 0.25 dB/km, preferably less than 0.23 dB/km, and more preferably less than 0.22 dB/km. Preferably, the NDNS fiber has an effective area at 1550 nm not less than 23 $\mu m^2$. In a preferred embodiment, the effective area is not less than 25 $\mu m^2$. More preferably, the effective area is not less than a value in the range from 28 $\mu m^2$ to 30 $\mu m^2$.

Figure 15:
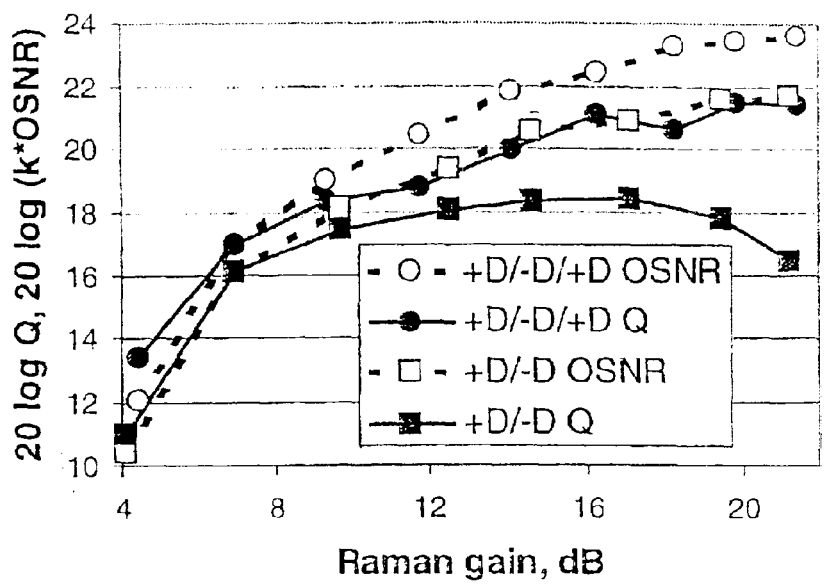
FIG. 15 shows performance results for Q and OSNR vs. Raman gain for various spans evaluated with the setup of FIG. 14.

Referring to FIG. 15, in another preferred embodiment, the NDNS fiber comprises three core segments: center core segment 220, first annular core segment or moat 222, and second annular core segment or ring 223. Preferably, center core segment 220 comprises a maximum relative refractive index or peak $\Delta$ or $\Delta_1\%$ between 0.6 and 1.2, more preferably between 0.8 and 1.2. The central core segment 220 ends and the first annular core segment 222 begins where the relative refractive index changes from positive to negative, at a radius of between about 2.2 and 2.7 $\mu$m. The first annular core segment 222 comprises a minimum depression $\Delta$ or $\Delta_2\%$ between −0.32 and −0.5, more preferably between −0.4 and −0.45. The moat 222 ends and the ring 223 begins where the relative refractive index changes from negative to positive at a radius of between about 5.4 and 6.2 $\mu$m. Preferably, the second annular core segment or ring 223 includes a flattened region 225 having a relative refractive index preferably between 0.0 and 0.2, more preferably between 0.0 and 0.1, and even more preferably essentially 0, which extends from a radius of about 5 $\mu$m to about 8 $\mu$m. Second annular core segment or ring 23 has a peak $\Delta\%$ or $\Delta_3\%$ of between about 0.28 and 0.35. Second annular core segment 223 ends where the $\Delta\%$ falls to essentially 0%. The outer annular cladding region or cladding segment 224 is disposed adjacent and surrounding second annular core segment 223, and preferably begins at a radius of between about 8.2 and 8.8 $\mu$m.

In a preferred embodiment, the NDNS fiber depicted in FIG. 13 comprises a center core segment 220 with a maximum relative refractive index or peak $\Delta$ or $\Delta_1\%$ of 1.2 and an alpha of about 1.7. The central core segment 220 ends and the first annular core segment 222 begins where the relative refractive index changes from positive to negative, at a radius of between about 2.94. The first annular core segment 222 comprises a minimum depression $\Delta$ or $\Delta_2\%$ of −0.32. The moat 222 ends and the ring 223 begins where the relative refractive index changes from negative to positive at a radius of 5.9 $\mu$m. The second annular core segment or ring 223 includes a flattened region 225 having a relative refractive index of essentially 0 and extending from a radius of about 5 $\mu$m to about 7.5 $\mu$m. Second annular core segment or ring 223 has a peak $\Delta\%$ or $\Delta_3\%$ of 0.29. Second annular core segment 223 ends where the $\Delta\%$ falls to essentially 0%. The outer annular cladding region or cladding segment 224 is disposed adjacent and surrounding second annular core segment 223, and preferably begins at a radius of 8.7 μm. The width of the positive Δ% portion of the second annular core is 2.33 μm, centered at a radius of 9.86 μm.

At 1550 nm, the optical fiber represented by FIG. 13 exhibited a total dispersion of about −16 ps/nm-km, dispersion slope of about −0.059 ps/nm²-km, attenuation of about 0.214 dB/km, effective area of about 27 μm², and a kappa (dispersion/dispersion slope) of about 275.

U.S. application Ser. No. 09/822,168 filed Mar. 30, 2001, and U.S. application Ser. No. 09/870,432 filed May 30, 2001, both of which are incorporated by reference herein, describe other preferred embodiments of NDNS fiber.

Figure 14:
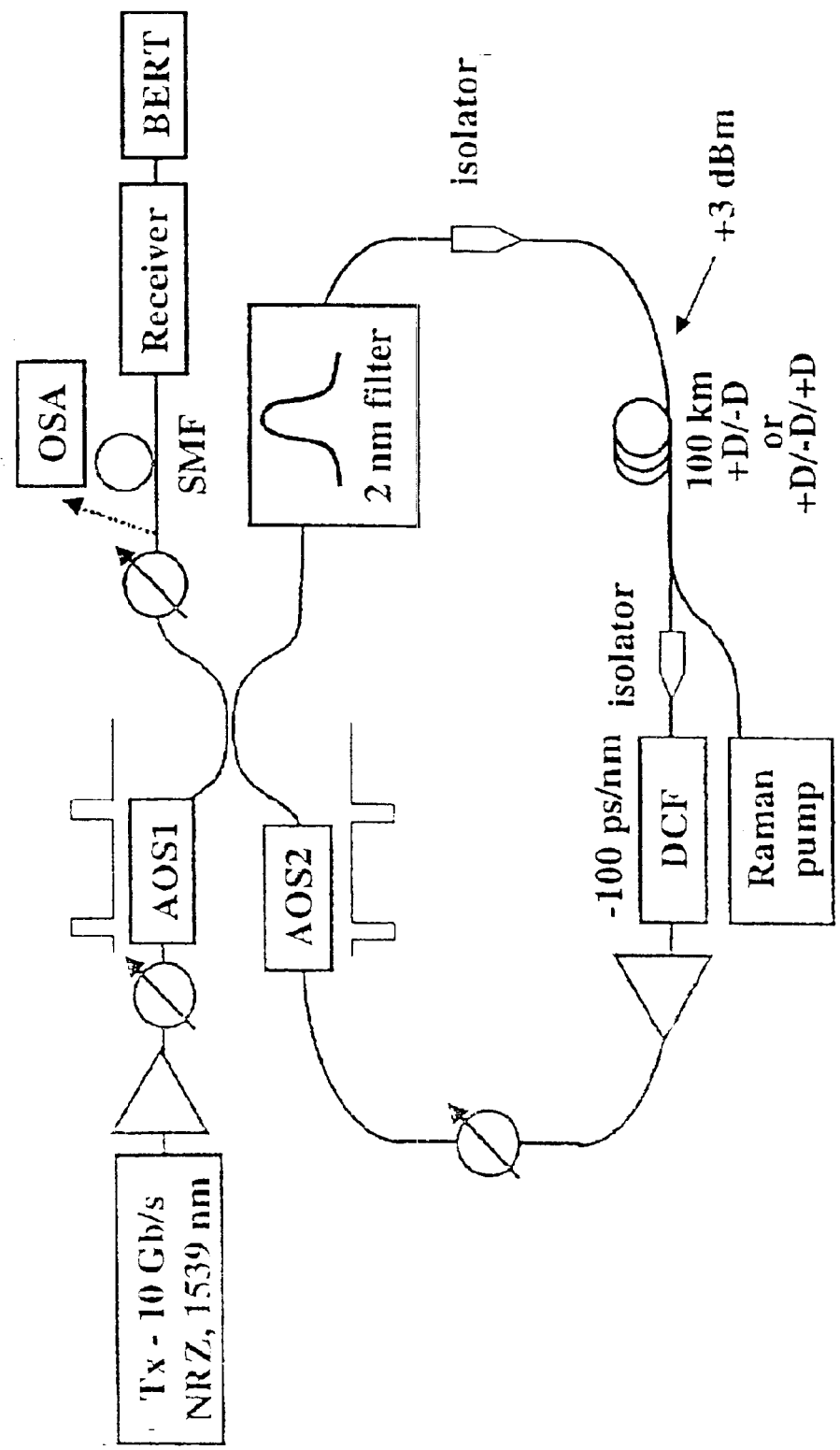
FIG. 14 is a schematic of an optical fiber setup used to evaluate dispersion managed spans of optical fiber.

FIG. 14 schematically illustrates an optical fiber setup comprising a transmitter of a 10 Gb/s NRZ-modulated signal at 1539 nm coupled to a recirculating loop that includes a 100-km span of 1:1 optical fiber sections of either +D/−D or +D/−D/+D optical fiber followed by a Raman amplifier and an EDFA. Optical isolators were disposed on both sides of the span to avoid lumped reflections. A 2-nm-wide filter was disposed in the loop to reject out-of-band ASE from the EDFA. Two acousto-optic switches, AOS1 and AOS2, and an optical spectrum analyzer, OSA, were included in the setup. Dispersion compensating fiber (DCF) amounting to −100 ps/nm was included to achieve nearly zero total dispersion after each span, and several kilometers of SMF-28™ fiber were placed at the receiver for fine dispersion tuning. Measurements indicated that signal power levels at all Raman gains were below the Brillouin thresholds of both fibers.

FIG. 15 shows measured results of the Q factor vs. Raman gain for 1:1 combinations of +D/−D and +D/−D/+D fibers (or fiber sections) with a 3 dBm span launch power in the setup of FIG. 14 after 14 circulations (i.e. 1400 km). FIG. 15 also shows corresponding OSNR data (shifted along the vertical axis by a fixed amount which is defined by transmitter/receiver parameters for ease of comparison). Without MPI, OSNR and Q should have similar shapes in the +D/−D case. Q increased for Raman gains up to about 15-17 dB and decreased thereafter despite improving OSNR with increasing Raman gain. Since the setup was assembled to achieve dispersion compensation and to eliminate cross-channel nonlinearities, the bifurcation of Q and OSNR can be taken to be evidence of degradation due to MPI. That is, for +D/−D, Raman gains appear to have decreased above 15-17 dB due to DRBS MPI. On the other hand, the Q factor of the +D/−D/+D combination increased monotonically with Raman gain over substantially the entire range of Raman gain from 4 dB to 21 dB, consistent with OSNR improvement with increasing Raman gain. As seen in FIG. 15, the rate of Q-factor increase slows down as the Q-factor comes closer to the back-to-back value of −25 dB. Accordingly, MPI-related performance degradation appears to be greatly reduced in the +D/−D/+D cable for Raman gain up to at least 21 dB. Compared with +D/−D cables, the +D/−D/+D combination achieves less Raman gain in the MPI-prone −D fiber section. Therefore, the total amount of DRBS power generated in the span is reduced and MPI-caused system degradations diminish. The difference between the highest Q for +D/−D/+D and the highest Q for +D/−D was 3 dB. Similar behavior was observed at 1 dBm launch power.

As seen in FIG. 15, 20 log Q for the +D/−D/+D combination was greater than or equal to about 19 for Raman gain greater than about 12 dB, and the Q values were greater than or equal to about 20 for Raman gain greater than about 15 dB. The Q values (20 log Q) for the +D/−D/+D combination at a Raman gain of about 20 was greater than the Q value at a Raman gain of 12 dB, while the Q value for the +D/−D combination at a Raman gain of about 20 dB was less than the Q value at a Raman gain of about 12 dB.

Figure 16:
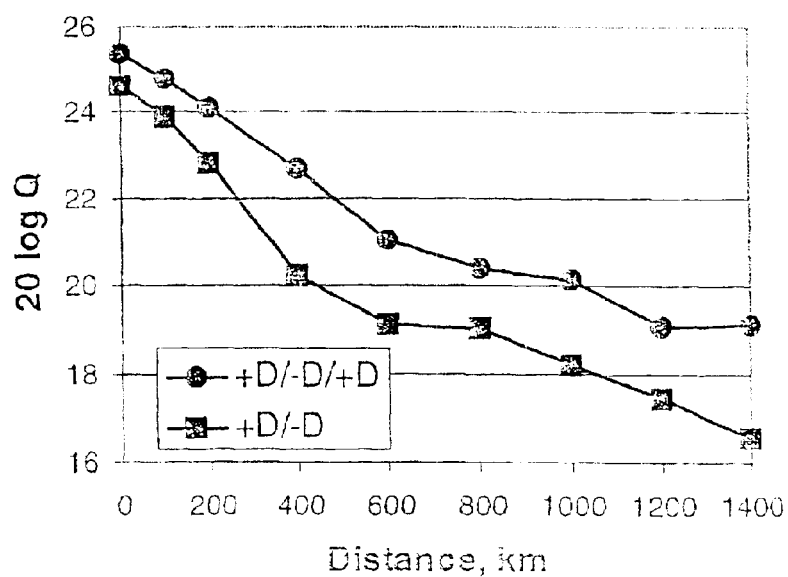
FIG. 16 shows performance results for Q vs. distance for various spans evaluated with the setup of FIG. 14.

FIG. 16 shows measured results of Q factor versus propagation distance along the loop for 1 dBm launch power into the span and 16 dB Raman gain. For transmission distances of up to about 500 km, the Q factor was greater than or equal to about 22. For transmission distances of up to about 1000 km, the Q factor was greater than or equal to about 20. For transmission distances of up to about 1400 km, the Q factor was greater than or equal to about 19. In the initial circulations, Q was dominated by transmitter/receiver penalties, but elsewhere the difference between +D/−D/+D and +D/−D varied between 1.4 and 2.6 dB. At 3 dBm and 16 dB Raman gain, the +D/−D/+D combination was used to reach 3200 km, 4000 km, and 4500 km around the loop, and measured Q values were 18.2 dB, 17.5 dB, and 16.6 dB, respectively.

Thus, dispersion managed cable with a −D fiber section sandwiched between two +D fiber sections exhibits advantages over known transmission fibers and other dispersion-managed configurations. For example, unlike a +D/−D configuration, the +D/−D/+D configuration can produce little or unnoticeable system degradations due to MPI. For counter-propagating-signal and pump, the sandwiched combination allows the Raman gain to be achieved earlier in the span, significantly improving Raman NF. An optical transmission link which includes dispersion managed cable preferably has a length greater than about 800 km, more preferably greater than about 100 km.

In some preferred embodiments, the average dispersion in a span or in an optical transmission line is preferably balanced to yield a finite negative value with a zero or slightly negative average slope at an operating wavelength, and more preferably over a range of operating wavelengths. The optical transmission line, or apparatus for transporting an optical signal, may then preferably comprise a positive dispersion optical fiber section, more preferably a positive dispersion positive slope (PDPS) optical fiber section, to achieve a desired net cumulative dispersion. In other preferred embodiments, the average dispersion in a span or in an optical transmission line is preferably balanced to yield a zero value with a substantially zero slope at an operating wavelength, and more preferably over a range of operating wavelengths. For still other applications, the average dispersion in a span or in an optical transmission line is preferably balanced to yield a zero value with a zero or slightly positive average slope at an operating wavelength, and more preferably over a range of operating wavelengths. Average dispersion in a span of zero could be useful in applications that involve operating at 40 Gbit/sec and higher.

Preferably, the kappa (i.e. the ratio of the dispersion and the dispersion slope) of the PDPS optical fiber section is of like sign with the the kappa of the NDNS optical fiber section. Preferably, the ratio of the PDPS kappa and the NDNS kappa is between 0.8 and 1.2, more preferably between 0.9 and 1.1, and even more preferably between about 0.95 and 1.05. More preferably still, the kappa of the PDPS optical fiber section is substantially equal to the kappa of the NDNS optical fiber section.

Preferably, the absolute magnitude of the average dispersion slope for a span is less than 0.02 ps/nm²-km, more preferably less than 0.01 ps/nm²-km.

Examples of a suitable PDPS optical fiber section are described hereinabove, such as those represented in FIGS. 8 and 9. Examples of a suitable NDNS optical fiber section are described hereinabove, such as the NDNS's represented in FIGS. 10-13.

For example, in one preferred embodiment, an optical fiber span comprises a PDPS optical fiber section, as described hereinabove and as represented in FIG. 9, and an NDNS optical fiber section, as described hereinabove and as represented in FIG. 10. The embodiment of the PDPS optical fiber section has a dispersion of about +19 ps/nm-km at about 1560 nm and a dispersion slope of about +0.06 ps/nm$^2$-km at about 1550 nm, and the embodiment of the NDNS optical fiber section has a dispersion of about −38 ps/nm-km at about 1560 nm and a dispersion slope of about −0.12 ps/nm$^2$-km at about 1550 nm. For a 50 km span comprised of 30 km of PDPS fiber and 20 km of NDNS fiber, the cumulative dispersion of the PDPS section equals +570 ps/nm and the cumulative dispersion of the NDNS section equals −760 ps/nm, for net cumulative dispersion of −190 ps/nm per span. The average dispersion across the span is −3.8 ps/nm-km (−190 ps/nm÷50 km) at 1560 nm. The cumulative dispersion slope of the PDPS section equals +1.8 ps/nm$^2$ and the cumulative dispersion slope of the NDNS section equals −2.4 ps/nm$^2$ for net cumulative dispersion slope of −0.6 ps/nm$^2$ per span. The average dispersion slope across the span is −0.012 ps/nm$^2$-km (−0.6 ps/nm$^2$÷50 km) at 1550 nm. Thus, the combination of PDPS and NDNS optical fiber sections preferably lowers the average dispersion slope. Table 1 lists the average dispersion across the span at various wavelengths calculated from an average dispersion across the span of −3.8 ps/nm-km at 1560 nm and from an average dispersion slope across the span of −0.012 ps/nm$^2$-km at 1550 nm.

TABLE 1

| Wavelength (nm) | Average Dispersion across Span (ps/nm-km) |
| --- | --- |
| 1530 | −3.44 |
| 1550 | −3.68 |
| 1560 | −3.8 |
| 1600 | −4.28 |
| 1630 | −4.64 |

As seen in Table 1 above, the average dispersion across the span varies from −3.44 to −4.64 ps/nm-km between 1530 nm and 1630 nm. That is, the average dispersion across the span over the entire wavelength range between 1530 nm and 1630 nm varies by less than 1.3 ps/nm-km. The cumulative dispersion across the span can then be compensated by a positive dispersion fiber or fiber section. The variation in average dispersion for a wavelength range can depend upon the magnitude of the average dispersion. For example, an average dispersion of −1.9 ps/nm-km at a wavelength of 1560 nm produces a variation of 0.6 ps/nm-km across the 1530-1630 nm band for substantially equal values of kappa for the PDPS and NDNS fiber sections. Average dispersion (and average slope) can be varied by varying the length of constituent PDPS and NDNS fiber sections, for example to account for variability in values of kappa which may arise during manufacture.

Preferably, the ratio of the absolute value of the magnitudes of the dispersion of the NDNS optical fiber section and the dispersion of one of the PDPS optical fiber sections is between about 0.7 and about 3, preferably within the operating wavelength region. In a preferred embodiment, the ratio is between about 0.7 and about 3 at 1550 nm.

In a preferred embodiment, the ratio of the absolute value of the magnitudes of the dispersion of the NDNS optical fiber section and the dispersion of one of the PDPS optical fiber sections is between about 1.25 and about 3. In another preferred embodiment, the ratio of the absolute value of the magnitudes of the dispersion of the NDNS optical fiber section and the dispersion of one of the PDPS optical fiber sections is between about 1.25 and about 1.75. In yet another preferred embodiment, the ratio of the absolute value of the magnitudes of the dispersion of the NDNS optical fiber section and the dispersion of one of the PDPS optical fiber sections is between about 1.4 and about 1.6, more preferably about 1.5.

Preferably, the average dispersion over the wavelength range between 1530 nm and 1630 nm across a span as disclosed herein, that is, the absolute value of the magnitude, or absolute magnitude, of the maximum difference between any two values of average dispersion over the wavelength range between 1530 nm and 1630 nm across a span, varies by less than about 3 ps/nm-km and more than 0.0 ps/nm-km, more preferably less than about 2 ps/nm-km and more than 0.1 ps/nm/km, even more preferably less than about 1.5 ps/nm-km and more than 0.2 ps/nm-km.

Preferably, the absolute value of the magnitude, or absolute magnitude, of the average dispersion at about 1560 nm is greater than 0.0 and less than about 5 ps/nm-km, more preferably greater than about 0.5 ps/nm-km and less than about 4 ps/nm-km.

In one preferred embodiment, the absolute magnitude of the average dispersion at about 1560 nm is greater than about 0.5 ps/nm-km and less than about 2.0 ps/nm-km. In another preferred embodiment, the absolute magnitude of the average dispersion at about 1560 nm is substantially zero.

In yet another preferred embodiment, the variation in the average dispersion over the wavelength range between 1530 nm and 1630 nm across a span as disclosed herein is between about 0.1 ps/nm-km and about 2.0 ps/nm-km, more preferably between about 0.2 ps/nm-km and about 1.0 ps/nm-km, and the average dispersion at about 1560 nm is between about 0.2 ps/nm-km and about 4 ps/nm-km, more preferably between about 0.5 ps/nm-km and about 2.0 ps/nm-km. Smaller values of average dispersion tend to reduce nonlinearities, such as cross-phase modulation and four wave mixing, at low bit rates, particularly at 10 Gbit/s, and larger values of average dispersion require more frequent dispersion compensation, either by additional lengths of compensative fiber or other compensative devices.

Two or more spans may be linked or optically coupled together, for example to form an optical transmission line.

For example, ten (10) spans comprised of the PDPS and NDNS optical fiber sections described in the Example above yields a cumulative dispersion of −1900 ps/nm at 1560 nm (average span dispersion of −3.8 ps/nm-km×50 km×10 spans) and a cumulative dispersion slope of −6 ps/nm$^2$ at 1560 nm (−0.12 ps/nm$^2$-km×50 km×10 spans). A total cumulative dispersion of substantially zero can be obtained by optically coupling a 100 km length of PDPS optical fiber to an end of the 10 spans, wherein the PDPS fiber section has a dispersion of +19 ps/nm-km at 1560 nm and a dispersion slope of +0.06 ps/nm$^2$-km at 1550 nm, which contributes +1900 ps/nm at 1560 nm and +6 ps/nm$^2$ at 1550 nm.

For a given span length, and for given optical properties of the PDPS optical fiber section and the NDNS optical fiber section, the average dispersion for a span varies according to variations in the ratio of the lengths of the PDPS and the NDNS optical fiber sections. Table 2 shows variations in cumulative dispersion per 50 km span for various illustrative lengths of the PDPS optical fiber and NDNS optical fiber described in the Example above.

TABLE 2

| PDPS Length (km) | NDNS Length (km) | Average Span Dispersion (ps/nm-km) |
|---|---|---|
| 30 | 20 | −3.8 |
| 31 | 19 | −2.66 |
| 32 | 18 | −1.52 |

Thus, the overall dispersion in a span or transmission line can be managed while higher local dispersion exists within the fibers or fiber sections within the span or line.

Preferably, an optical transmission line, or an apparatus for transmitting optical signals, preferably comprises one or more pump light emitting devices optically coupled to one or more optical fiber sections. In a preferred embodiment, at least one span has more than one pump light emitting devices optically coupled thereto. In another preferred embodiment, a span has two or more pump light emitting devices optically coupled thereto. In yet another preferred embodiment, a span comprises two or more Raman pump devices optically coupled thereto. Preferably, a Raman pump is provided for each polarization at a given wavelength. In another preferred embodiment, two Raman pumps are provided which differ in pump wavelength. In another embodiment, at least one erbium doped amplifier (EDFA) is optically coupled to the span.

In a preferred embodiment, an apparatus for transporting an optical signal comprises an optical fiber span comprising a PDPS optical fiber section and a NDNS optical fiber section, wherein the absolute magnitude of the average dispersion across the span varies by less than about 5 ps/nm-km over the entire wavelength range between 1530 nm and 1630 nm.

In another preferred embodiment, the absolute magnitude of the average dispersion across the span varies by less than about 3 ps/nm-km and more than 0.0 ps/nm-km over the entire wavelength range between 1530 nm and 1630 nm.

In yet another preferred embodiment, the absolute magnitude of the average dispersion across the span varies by less than about 2 ps/nm-km and more than 0.1 ps/nm/km over the entire wavelength range between 1530 nm and 1630 nm.

In still another preferred embodiment, the absolute magnitude of the average dispersion across the span varies by less than about 1.5 ps/nm-km and more than about 0.2 ps/nm-km over the entire wavelength range between 1530 nm and 1630 nm.

In yet another preferred embodiment, the absolute magnitude of the average dispersion across the span varies by less than about 2 ps/nm-km, more preferably by less than about 1.5 ps/nm-km, and even more preferably by less than about 0.6 ps/nm-km over the entire wavelength range between 1530 nm and 1630 nm.

In still another preferred embodiment, the absolute magnitude of the average dispersion at about 1560 nm is greater than 0.0 and less than about 5 ps/nm-km, more preferably greater than about 0.5 ps/nm-km and less than about 4 ps/nm-km., and even more preferably greater than about 0.5 ps/nm-km and less than about 2.0 ps/nm-km.

In another preferred embodiment, the absolute magnitude of the average dispersion at about 1560 nm is substantially zero.

In yet another preferred embodiment, the absolute magnitude of the average dispersion at about 1560 nm across the span varies by less than about 2 ps/nm-km and more than 0.1 ps/nm/km, and the absolute magnitude of the average dispersion at about 1560 nm is greater than about 0.2 ps/nm-km and less than about 4 ps/nm-km.

In still another preferred embodiment, the average dispersion at about 1560 nm is negative.

In another preferred embodiment, the absolute magnitude of the average dispersion at about 1560 nm is greater than about 2 ps/nm-km and less than about 4 ps/nm-km.

In yet another preferred embodiment, the absolute magnitude of the average dispersion at about 1560 nm is greater than about 0.5 ps/nm-km and less than about 2 ps/nm-km.

In another preferred embodiment, the average dispersion at about 1560 nm is positive.

In yet another preferred embodiment, the absolute magnitude of the average dispersion across the span varies by less than about 5 ps/nm-km over the entire wavelength range between 1530 nm and 1630 nm.

Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. An apparatus for transporting an optical signal at a signal wavelength comprising:

an optical fiber span comprising:

first and second PDPS optical fiber sections having positive dispersion and positive dispersion slope at the signal wavelength;

a NDNS optical fiber section disposed between said first and second PDPS optical fiber sections and having negative dispersion and negative dispersion slope at the signal wavelength; and a pump light emitting device optically coupled to one of the PDPS optical fiber sections for providing Raman amplification to the optical fiber span, wherein the PDPS optical fiber coupled to the pump light emitting device has an effective area of greater than or eaual to about 80 $\mu m^2$ at a wavelength of 1550 nm;

wherein the ratio of the combined lengths of the PDPS optical fiber sections to the NDNS optical fiber section is greater than about 0.7.

2. The apparatus of claim 1 wherein the ratio of the combined lengths of the PDPS optical fiber sections to the NDNS optical fiber section is between about 0.7 and about 3.

3. The apparatus of claim 1 wherein the ratio of the combined lengths of the PDPS optical fiber sections to the NDNS optical liber section is between about 1.25 and about 1.75.

4. The apparatus of claim 1 wherein at least one of the optical fiber sections exhibits an attenuation of less than about 0.2 dB/km at a wavelength of 1550 nm.

5. The apparatus of claim 1 wherein at least one of the optical fiber sections exhibits a PMD of less than about 0.10 $ps/km^{1/2}$ at the signal wavelength.

6. The apparatus of claim 1 wherein at least one of the optical fiber sections exhibits an attenuation of less than about 0.4 dB/km at a wavelength of 1380 nm.

7. The apparatus of claim 1 wherein the combined length of the first PDPS optical fiber section, the second PDPS optical fiber section, and the NDNS optical fiber section is in the range of about 50 km to about 150 km.

8. The apparatus of claim 1 wherein the Raman noise figure of the optical fiber span is less than −2 dB for Raman gain of between about 10 dB and about 15 dB.

9. The apparatus of claim 1 wherein the Raman noise figure of the optical fiber span is less than −3 dB for Raman gain of between about 12 dB and about 18 dB.

10. The apparatus of claim 1 wherein the Raman noise figure of the optical fiber span is less than −4 dB for Raman gain of between about 18 dB and about 28 dB.

11. The apparatus of claim 1 wherein the Raman noise figure of the optical fiber span is less than −4.5 dB for Raman gain greater than about 20 dB.

12. The apparatus of claim 1 wherein the combined length of the first PDPS optical fiber section, the second PDPS optical fiber section; and the NDNS optical fiber section is greater than about 75 km.

13. The apparatus of claim 1 wherein at least one of the PDPS optical fiber sections has an effective area of greater than or equal to about 95 $\mu m^2$ at 1550 nm.

14. The apparatus of claim 1 wherein the NDNS optical fiber section has an effective area of between about 20 and about 40 $\mu m^2$ at 1550 nm.

15. The apparatus of claim 1 wherein ratio of the effective area of at least one of the PDPS optical fiber sections to the effective area of the NDNS optical fiber section is not greater than about 4.

16. The apparatus of claim 1 further comprising a plurality of optical devices disposed between the ends of the optical fiber span.

17. The apparatus of claim 1 further comprising a dispersion compensating module (DCM) disposed at one of the ends of the optical fiber span.

18. The apparatus of claim 1 wherein the ratio of the absolute value of the magnitudes of the dispersion of the NDNS optical fiber section and the dispersion of one of the PDPS optical fiber sections is between about 0.7 and about 3.

19. The apparatus of claim 1 wherein the ratio of the absolute value of the magnitudes of the dispersion of the NDNS optical fiber section and the dispersion of one of the PDPS optical fiber sections is between about 1.25 and about 1.75.

20. The apparatus of claim 1 wherein the absolute magnitude of the average dispersion across the span varies by less than about 5 ps/nm-km over the entire wavelength range between 1530 nm and 1630 nm.

21. The apparatus of claim 1 wherein the absolute magnitude of the average dispersion across the span varies by less than about 2 ps/nm-km over the entire wavelength range between 1530 nm and 1630 nm.

22. The apparatus of claim 1 wherein the absolute magnitude of the average dispersion across the span varies by less than about 0.6 ps/nm-km over the entire wavelength range between 1530 nm and 1630 nm.

23. The apparatus of claim 1 wherein the absolute magnitude of the average dispersion at about 1560 nm is greater than 0.0 and less than about 5 ps/nm-km.

24. The apparatus of claim 1 wherein the absolute magnitude of the average dispersion at about 1560 nm is substantially zero.

25. The apparatus of claim 1 wherein the absolute magnitude of the average dispersion across the span varies by less than about 2 ps/nm-km and more than 0.1 ps/nm/kin, and wherein the absolute magnitude of the average dispersion at about 1560 nm is greater than about 0.2 ps/nm-km and less than about 4 ps/nm-km.

26. The apparatus of claim 1 wherein the average dispersion at about 1560 nm is negative.

27. The apparatus of claim 1 wherein the average dispersion at about 1560 nm is positive.

28. The apparatus of claim 1 wherein the optical transmission line exhibits a value for 20 log Q at a Raman gain of 20 dB which is higher than at a Rainan gain of 12 dB.

29. The apparatus of claim 1 wherein the NDNS fiber section compresses the optical signal to a smaller width than its width at the entry to one of the PDPS fiber sections.

30. The apparatus of claim 1 wherein the signal wavelength is about 1550 nm.

31. An optical transmission system for transmission of an optical signal at a signal wavelength comprising:
at least two optically coupled optical fiber spans, each span comprising first and second positive dispersion optical fiber sections and a negative dispersion optical fiber section disposed between said first and second positive dispersion optical fiber sections; and
at least two pump light emitting devices for providing Raman amplification, including first and second Raman amplifiers, wherein the first Raman amplifier is optically coupled to one of the positive dispersion optical fiber sections of one of the optical fiber spans, and wherein the second Ranian amplifier is optically coupled to one of the positive dispersion optical fiber section of another of the optical fiber spans;
wherein each of the positive dispersion optical fiber sections has a positive dispersion at the signal wavelength;
wherein the negative dispersion optical fiber section has a negative dispersion at the signal wavelength; and
wherein the length of optical fiber in the optical transmission line between the first and second Raman amplifiers is greater than about 50 km.

32. The optical transmission system of claim 31 wherein at least one of the positive dispersion optical fiber sections has a positive dispersion slope at the signal wavelength.

33. The optical transmission system of claim 31 wherein the negative dispersion optical fiber section has a negative dispersion slope at the signal wavelength.

34. A method of transmitting an optical signal through the optical transmission system of claim 31 while operating at a per-channel bit rate of 10 Gbit/sec.

35. A method of transmitting an optical signal through the optical transmission system of claim 31 while operating at a per-channel bit rate of 40 Gbit/sec.

36. A method of transmitting optical signals through the optical transmission system of claim 31 while operating at 3 or more wavelengths.

37. The apparatus of claim 1 wherein the PDPS optical fiber coupled to the pump light emitting device has an effective area of greater than or equal to about 90 $\mu m^2$ at a wavelength of 1550 nm.

38. The apparatus of claim 1 wherein the PDPS optical fiber coupled to the pump light emitting device has an effective area of greater than or equal to about 90 $\mu m^2$ at a wavelength of 1550 nm.

39. The apparatus of claim 1 wherein the PDPS optical fiber coupled to the pump light emitting device has an effective area of between about 95 $\mu m^2$ and 110 $\mu m^2$ at a wavelength of 1550 nm.

40. The apparatus of claim 1 wherein the PDPS optical fiber coupled to the pump light emitting device exhibits an attenuation at a wavelength of about 1550 nm of less than or equal to about 0.2 dB/km.

41. The apparatus of claim 1 wherein the PDPS optical fiber coupled to the pump light emitting device exhibits an attenuation at a wavelength of about 1550 nm of less than or equal to about 0.19 dB/km.

* * * * *

UNITED STATES PATENT AND TRADEMARK OFFICE
CERTIFICATE OF CORRECTION

PATENT NO.       : 6,943,935 B2
APPLICATION NO.  : 10/094530
DATED            : September 13, 2005
INVENTOR(S)      : Scott R. Bickham et al.

It is certified that error appears in the above-identified patent and that said Letters Patent is hereby corrected as shown below:

Column 24,
Line 39, "device has an effective area of greater than or eaual to" should read
-- device has an effective area of greater than or equal to --.

Column 25,
Line 1, "9. The apparatus of claim 1, wherein the Rarnan noise" should read
-- 9. The apparatus of claim 1, wherein the Raman noise --.
Line 67, "of 20 dB which is higher than at a Rainan gain of 12 dB." should read
-- of 20 dB which is higher than at a Raman gain of 12 dB. --.

Column 26,
Line 19, "wherein the second Ranian amplifier is optically" should read
-- wherein the second Raman amplifier is optically --.

Signed and Sealed this

Eleventh Day of July, 2006

JON W. DUDAS
*Director of the United States Patent and Trademark Office*